(12) United States Patent
Anand et al.

(10) Patent No.: US 11,055,833 B2
(45) Date of Patent: Jul. 6, 2021

(54) CIRCUIT DEVICE AND ELECTRONIC APPARATUS

(71) Applicant: SEIKO EPSON CORPORATION, Tokyo (JP)

(72) Inventors: Kumar anandabairavasamy Anand, Richmond (CA); Wittmeir Manfred, Aichach (DE); Jeffrey Eric, Richmond (CA)

(73) Assignee: SEIKO EPSON CORPORATION, Tokyo (JP)

( * ) Notice: Subject to any disclaimer, the term of this patent is extended or adjusted under 35 U.S.C. 154(b) by 34 days.

(21) Appl. No.: 16/129,054

(22) Filed: Sep. 12, 2018

(65) Prior Publication Data

US 2019/0266711 A1  Aug. 29, 2019

(30) Foreign Application Priority Data

Feb. 28, 2018 (JP) .............................. JP2018-034613

(51) Int. Cl.
| | |
|---|---|
| *G06T 5/50* | (2006.01) |
| *G06T 7/13* | (2017.01) |
| *G02B 27/01* | (2006.01) |
| *H04N 5/14* | (2006.01) |
| *G06T 7/00* | (2017.01) |

(52) U.S. Cl.
CPC ............... *G06T 5/50* (2013.01); *G02B 27/01* (2013.01); *G06T 7/0002* (2013.01); *G06T 7/13* (2017.01); *H04N 5/142* (2013.01); *G06T 2207/30168* (2013.01)

(58) Field of Classification Search
CPC ....................... G06K 2009/6213; H04N 7/183
USPC ....... 382/190, 244, 167, 165, 166, 263, 209, 382/249; 455/450; 345/690, 589
See application file for complete search history.

(56) References Cited

U.S. PATENT DOCUMENTS

| | | |
|---|---|---|
| 5,848,199 A | 12/1998 | Naqvi |
| 2008/0089611 A1 | 4/2008 | McFadyen et al. |

(Continued)

FOREIGN PATENT DOCUMENTS

| | | |
|---|---|---|
| JP | H10-049665 A | 2/1998 |
| WO | 2018/034214 A1 | 2/2018 |

OTHER PUBLICATIONS

Jul. 23, 2019 Extended Search Report issued in European Patent Application No. 19159375.5.

(Continued)

*Primary Examiner* — Kiet M Doan
(74) *Attorney, Agent, or Firm* — Oliff PLC

(57) ABSTRACT

Provided is a circuit device that can appropriately detect an error in a display image in a head up display, an electronic apparatus, an error detection method, and the like. The circuit device includes an image processing circuit and a comparison circuit. The image processing circuit performs first mapping processing, which maps an input first image on a second image to be projected onto a projection target object, and second mapping processing, which converts the second image to a third image. The second mapping processing is reverse mapping processing of the first mapping processing. The comparison circuit performs comparison between the first image and the third image, and outputs the result of comparison as information for performing error detection on the second image.

15 Claims, 16 Drawing Sheets

(56) References Cited

U.S. PATENT DOCUMENTS

| | | | |
|---|---|---|---|
| 2014/0225941 A1* | 8/2014 | Van der Vleuten | ........................ G11B 27/329 345/690 |
| 2015/0269737 A1* | 9/2015 | Lam | ..................... H04N 13/111 382/154 |
| 2019/0065877 A1* | 2/2019 | Kalyuzhny | .............. G06K 9/72 |

OTHER PUBLICATIONS

Greisen, Pierre et al., "Spatially-Varying Image Warping: Evaluations and VLSI Implementations", vol. 418, pp. 64-87, Jan. 1, 2013.

Smolic, Aljoscha et al., "Non-linear Warping and Warp Coding for Content-Adaptive Prediction in Advanced Video Coding Applications", pp. 4225-4228, Sep. 23, 2010.

Al-Najjar, Yusra A.Y. et al., "Comparison of Image Quality Assessment PSNR, HVS, SSIM, UIQ", vol. 3, iss. 8, Aug. 2012.

Zhang, Yichi et al., "Objective Quality Assessment of Image Retargeting by Incorporating Fidelity Measures and Inconsistency Detection", vol. 26, No. 13, pp. 5980-5993, Dec. 1, 2017.

\* cited by examiner

ANALYSIS IMAGE

REFERENCE IMAGE

CIRCUIT DEVICE AND ELECTRONIC APPARATUS

This application claims the benefit of priority from Japanese Patent Application No. 2018-034613 filed Feb. 28, 2018, the entire contents of which are incorporated herein by reference.

BACKGROUND

1. Technical Field

The present disclosure relates to a circuit device, an electronic apparatus, and the like.

2. Related Art

A head up display (HUD) is known in which a two-dimensional image is projected on a projection target object and the projected image is displayed to a user. The projection target object is an automobile windshield or the like, for example, and in many cases, the projection target object has a non-planar shape. Therefore, a head up display controller (HUDC) performs mapping processing on an image such that, when an image is projected on a non-planar surface, a non-distorted image is displayed to a user.

A known technique of the mapping processing is disclosed in JP-A-10-49665, for example. A method of mapping pixels between a source arrangement and a destination arrangement is described in JP-A-10-49665, and specifically, a method of reverse mapping from the destination arrangement to the source arrangement is described in detail. The source arrangement is a pixel arrangement before performing the mapping processing, and the destination arrangement is a pixel arrangement that is the destination when coordinates are converted by performing mapping processing on the source arrangement.

There is a problem in that, when the head up display controller performs mapping processing as described above, it is not certain that the image displayed in the head up display includes appropriate display content. That is, whether or not the map data to be used for the mapping processing is normal, or whether or not the coordinate conversion using the map data is properly performed needs to be confirmed. In the known mapping processing technique, although the mapping method itself is disclosed, a method of confirming whether or not the mapping processing has been properly performed is not disclosed.

SUMMARY

One aspect of the present disclosure relates to a circuit device including: an image processing circuit configured to perform first mapping processing, which is processing of mapping an input first image on a second image to be projected onto a projection target object, and second mapping processing for converting the second image to a third image, which is reverse mapping processing of the first mapping processing; and a comparison circuit configured to perform comparison between the first image and the third image, and outputs the result of comparison as information for performing error detection on the second image.

Also, in one aspect, the comparison circuit may be configured to obtain an index that represents a degree of matching between the first image and the third image as the result of comparison, based on pixel values of the first image and pixel values of the third image, or based on pixel values of an edge image of the first image and pixel values of an edge image of the third image.

Also, in one aspect, the image processing circuit may perform the first mapping processing using first map data generated from map data associated with the projection target object, and performs the second mapping processing using second map data, the second map data being the map data.

Also, another aspect of the present disclosure relates to a circuit device including: an image processing circuit configured to perform first mapping processing, which is processing of mapping an input first image on a second image to be projected onto a projection target object, based on map data associated with a projection target object, and second mapping processing, which is different from the first mapping processing, for converting the first image to a third image based on the map data; and a comparison circuit configured to perform comparison between the second image and the third image, and outputs the result of comparison as information for performing error detection on the second image.

Also, in another aspect, the comparison circuit may be configured to obtain an index that represents a degree of matching between the second image and the third image as the result of comparison, based on pixel values of the second image and pixel values of the third image, or based on pixel values of an edge image of the second image and pixel values of an edge image of the third image.

Also, in another aspect, the image processing circuit may perform the first mapping processing using first map data generated from the map data, and performs the second mapping processing using second map data, the second map data being the map data.

Also, in another aspect, the image processing circuit may be configured to generate the third image whose resolution is lower than that of the second image, and the comparison circuit may be configured to reduce the resolution of the second image so as to match the resolution of the third image, and compare the third image with the second image whose resolution has been reduced.

Also, in another aspect, the circuit device may further include an error detection circuit configured to perform error detection on the second image based on the result of comparison.

Also, in another aspect, the circuit device may further include an operation mode setting register in which an operation mode of the circuit device when an error is determined by the error detection circuit is set.

Also, in another aspect, in the operation mode setting register, a mode of reporting a result of the error detection to a device external to the circuit device, a mode of not displaying the second image, and a mode of displaying a specific image, may be set as the operation modes.

Also, in another aspect, the error detection circuit may be configured to perform the error detection by comparing the result of comparison with a threshold value for determining an error in the second image.

Also, in another aspect, the circuit device may further include a threshold value register in which the threshold value is set.

Also, yet another aspect of the present disclosure relates to an electronic apparatus including the circuit device according to any of the above descriptions.

BRIEF DESCRIPTION OF THE DRAWINGS

The embodiments will be described with reference to the accompanying drawings, wherein like numbers reference like elements.

DESCRIPTION OF EXEMPLARY EMBODIMENTS

The following is a detailed description of exemplary embodiments of the invention. Note that the embodiments described below are not intended to unduly limit the content of the invention recited in the claims, and all of the configurations described in the embodiments are not necessarily essential as solutions provided by the invention.

1. First and Second Exemplary Configurations

Figure 1:
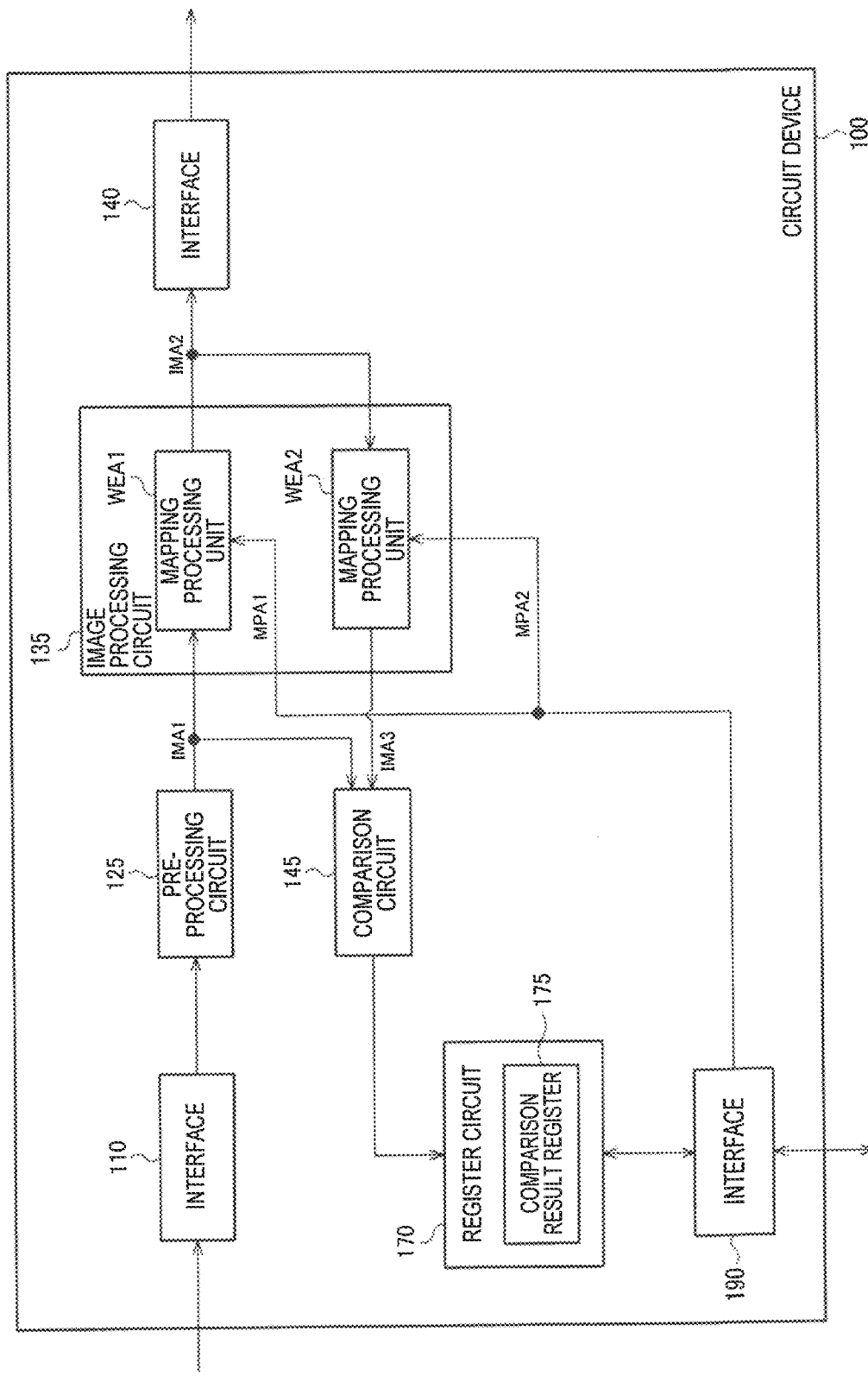
FIG. 1 shows a first exemplary configuration of a circuit device of a present embodiment.

FIG. 1 shows a first exemplary configuration of a circuit device of a present embodiment. A circuit device 100 includes an interface 110 (first interface), a pre-processing circuit 125, an image processing circuit 135, an interface 140 (second interface), a comparison circuit 145, a register circuit 170, and an interface 190 (third interface). The circuit device 100 is an integrated circuit device (IC), for example.

The interface 110 receives image data that is transmitted from a processing device 200 or the like to the circuit device 100, and converts the received image data to a format that is used inside the circuit device 100, for example. For example, the interface 110 is an OpenLDI (Open LVDS Display Interface), and converts a serial signal received using LVDS (Low Voltage Differential Signaling) to a RGB parallel signal. The processing device 200 is an SoC (System on a Chip), an MCU (Micro Control Unit), a CPU (Central Processing Unit), and the like.

The pre-processing circuit 125 performs pre-processing on image data input from the interface 110, and outputs an image IMA1 subjected to the pre-processing. For example, the pre-processing circuit 125 performs gamma correction, FRC (Frame Rate Control), white balance processing, and the like, as the pre-processing. The pre-processing circuit 125 is a circuit that acquires an image input to the image processing circuit 135, and is also referred to as an image acquisition circuit.

The image processing circuit 135 includes a mapping processing unit WEA1 that maps an image so as to conform to the surface shape of a projection target object, and a mapping processing unit WEA2 that performs reverse mapping thereof. Specifically, the mapping processing unit WEA1 performs mapping processing on an image IMA1 that has been output from the pre-processing circuit 125 using map data MPA1, and outputs an image IMA2 subjected to the mapping processing. This mapping processing is processing for converting the image IMA1 such that the image projected on a projection target object is not distorted when viewed by a user. The mapping processing unit WEA2 performs mapping processing on the image IMA2 that has been output from the mapping processing unit WEA1 using map data MPA2, and outputs an image IMA3 subjected to the mapping processing. This mapping processing corresponds to a reverse conversion of the mapping processing performed by the mapping processing unit WEA1. That is, the mapping processing is to convert the image IMA2 that has been converted according to the projection target object to an image before conversion.

When an error does not occur in the mapping processing, the degree of matching between images IMA3 and IMA1 is high, and therefore, as a result of comparing the images IAM3 and IMA1 using a later-described comparison circuit 145, whether or not the image IMA2, which is the display image, is a normal image can be detected. Note that the images IMA3 and IMA1 need not be completely matched with respect to image data, and the images need only be similar to a degree such that the images can be compared by the comparison circuit 145. That is, the mapping processing performed by the mapping processing unit WEA2 is a reverse conversion of the mapping processing performed by the mapping processing unit WEA1, but the reverse conversion need not be a reverse conversion so as to make the images IMA3 and IMA1 to completely match.

The projection target object refers to an object on which the image IAM2 is projected or displayed. That is, the image IMA2 is output from the interface 140 to a projection device, and the projection device projects the image IMA2 on the projection target object. The image projected on the projection target object is displayed to the user. The projection device includes a liquid-crystal display panel, a display driver that drives the liquid-crystal display panel, a light source, and a lens, for example. The display driver causes the liquid-crystal display panel to display an image based on the image data, the light source outputs light to the liquid-crystal display panel, and the light that has passed through the liquid-crystal display panel is projected on the projection target object by the lens. The projection target object has a reflecting surface that reflects light projected thereon, and the reflecting surface is a surface of the projection target object, for example. The reflecting surface is a surface that reflects at least a portion of the incident light, and the reflection may be either of diffused reflection and specular reflection. The projection target object is a target object on which the head up display projects an image, and in the case of an in-vehicle head up display, the projection target object is an automobile windshield, or the like. Note that the projection target object is not limited to this example, and needs only be a target object on which an image is projected or displayed by a projection device.

The mapping processing is processing in which coordinate conversion is performed with respect to pixel positions of an image based on map data. The mapping processing can include interpolation processing of pixel values or the like as processing that accompanies the coordinate conversion. The mapping processing includes forward mapping and reverse mapping. In the forward mapping, coordinates of pixel positions of an image before processing are converted to those of pixel positions of the image after processing, and the image after processing is generated using the result of the coordinate conversion. That is, pixels of the image before processing are successively selected, the coordinate of the pixel position (xa, ya) of a selected pixel is converted, and the pixel value of the pixel is set to the pixel value at the pixel position (ua, va) after coordinate conversion. On the other hand, in the reverse mapping, the coordinates of pixel positions of the image after processing are converted to pixel positions of the image before processing, and an image after processing is generated using the result of coordinate conversion. That is, pixel positions of the image after processing are successively selected, the coordinate of a selected pixel position (ub, vb) is converted to a pixel position of the image before processing, and the pixel value of the pixel at the pixel position (xb, yb) is set to the pixel value at the pixel position (ub, vb) of an image after processing.

The map data is data representing coordinate conversion associated with the shape of a reflecting surface of a projection target object, and is table data that associates the pixel positions of an image before mapping processing with the pixel positions of an image after mapping processing. The map used for the forward mapping is referred to as a forward map, and the map data is table data in which pixel positions (ua, va) of an image after mapping processing are associated with pixel positions (xa, ya) of an image before the mapping processing. The map used for the reverse mapping is referred to as a reverse map, and the map data is table data in which pixel positions (xb, yb) of an image before mapping processing are associated with pixel positions (ub, vb) of an image after the mapping processing. The map data MPA1 and MPA2 used by the mapping processing units WEA1 and WEA2 are input to the mapping processing units WEA1 and WEA2 from the processing device 200 via the interface 190, for example.

The interface 140 outputs the image IMA2 to a device external to the circuit device 100. The device external to the circuit device 100 is a display driver that drives a display panel, for example. For example, the interface 140 is an LVDS interface, and converts a RGB parallel signal from the image processing circuit 135 to an LVDS serial signal.

The comparison circuit 145 performs processing for comparing the image IMA1 and the image IMA3, and outputs the comparison result. This comparison result is used to detect an error in the image IMA2. That is, the comparison result is used to verify whether or not the map data MPA1 is normal and the mapping processing has been properly performed by the mapping processing unit WEA1. Specifically, the comparison circuit 145 obtains an index representing the degree of matching between the image IMA1 and the image IMA3. This index corresponds to a later-described shape index, and is an index whose value changes according to the degree of matching between the shapes or the edges of the shapes displayed in the images IMA1 and IMA3. Alternatively, a later-described visibility index may be obtained as the index. The visibility index is an index whose value changes according to the degree of dissimilarity between an image of a region of interest in which an icon or the like is displayed and an image of the other background region. The image in a region of interest is also referred to as a foreground image. Specifically, the index indicating the contrast between a foreground image and a background image is obtained by comparing histograms of pixel values of the images IMA1 and IMA3.

The register circuit 170 is configured to be accessible from the processing device 200 via the interface 190. The register circuit 170 includes a comparison result register 175 for storing comparison result information output from the comparison circuit 145, and the processing device 200 reads out the comparison result information from the comparison result register 175 via the interface 190. The processing device 200 includes an error detection circuit that performs error detection based on the comparison result information. An error in the image IMA2 to be projected onto a projection target object can be detected by the above-described image comparison and error detection. That is, whether or not the mapping processing performed by the mapping processing unit WEA1 has been property performed is detected.

Note that, in the above-described configuration, comparison result information output by the comparison circuit 145 is stored in the register circuit 170, the processing device 200 reads out the comparison result information from the register circuit 170 via the interface 190, and the error detection circuit in the processing device 200 performs error detection, but there is no limitation thereto. That is, in the case where an error detection circuit is included in the circuit device 100 such as that shown in FIG. 4 or the like, the error detection circuit in the circuit device 100 may perform error detection based on the comparison result information output from the comparison circuit 145. In this case, after the error detection circuit in the circuit device 100 detected an error, the circuit device 100 may interrupt the processing device 200 so as to report the error.

The interface 190 mediates communication between the circuit device 100 and processing device 200 with respect to setting information, control information, and the like. For example, the interface 190 is a serial communication interface conforming to the SPI (Serial Peripheral Interface) method, the I2C method, or the like. The setting information and control information from the processing device 200 is written into the register circuit 170, for example, and the circuit device 100 performs an operation according to the setting information and control information.

Note that, logic circuits included in the circuit device 100 may be configured as separate circuits, or may be configured as an integrated circuit using automatic placement and routing or the like, for example. The logic circuits are the pre-processing circuit 125, the image processing circuit 135, a comparison circuit 145, for example. Also, a portion or all of the logic circuits may be realized by a processor such as a DSP (Digital Signal Processor). In this case, programs or instruction sets in which functions of the circuits are described are stored in a memory, and the functions of the circuits are realized by the processor executing the programs or the instruction sets.

Figure 2:
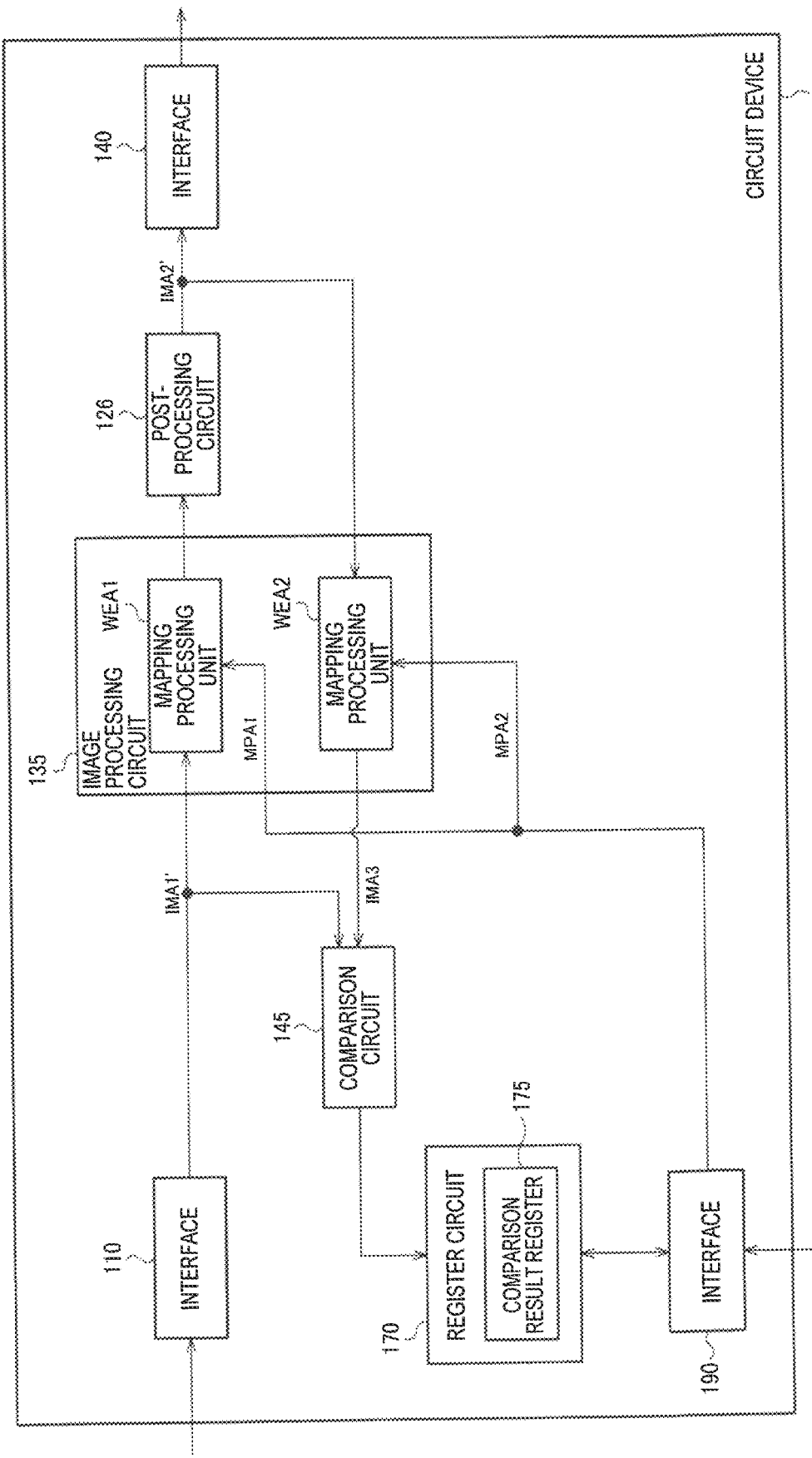
FIG. 2 shows a modification of the circuit device in the first exemplary configuration.

The pre-processing circuit 125 has been described as a circuit for acquiring an image to be input to the image processing circuit 135, but there is no limitation thereto. FIG. 2 shows a modification of the circuit device of the first exemplary configuration. For example, the image data input from the interface 110 is denoted as IMA1', and the mapping processing unit WEA1 performs mapping processing on the IMA1' using the map data MPA1. The configuration may be such that, thereafter, the post-processing circuit 126 performs gamma correction, FRC, white balance processing or the like on the image data subjected to mapping processing performed by the mapping processing unit WEA1 as post-processing. The post-processing circuit 126 corresponds to the pre-processing circuit 125 in FIG. 1. The mapping processing unit WEA2 performs mapping processing on image data IMA2' output from the post-processing circuit 126 using the map data MPA2. In this case, in addition to confirming whether or not the mapping processing is properly performed, it can be confirmed whether the image has not been largely changed due to post-processing such as gamma correction, FRC, or white balance processing.

Figure 3:
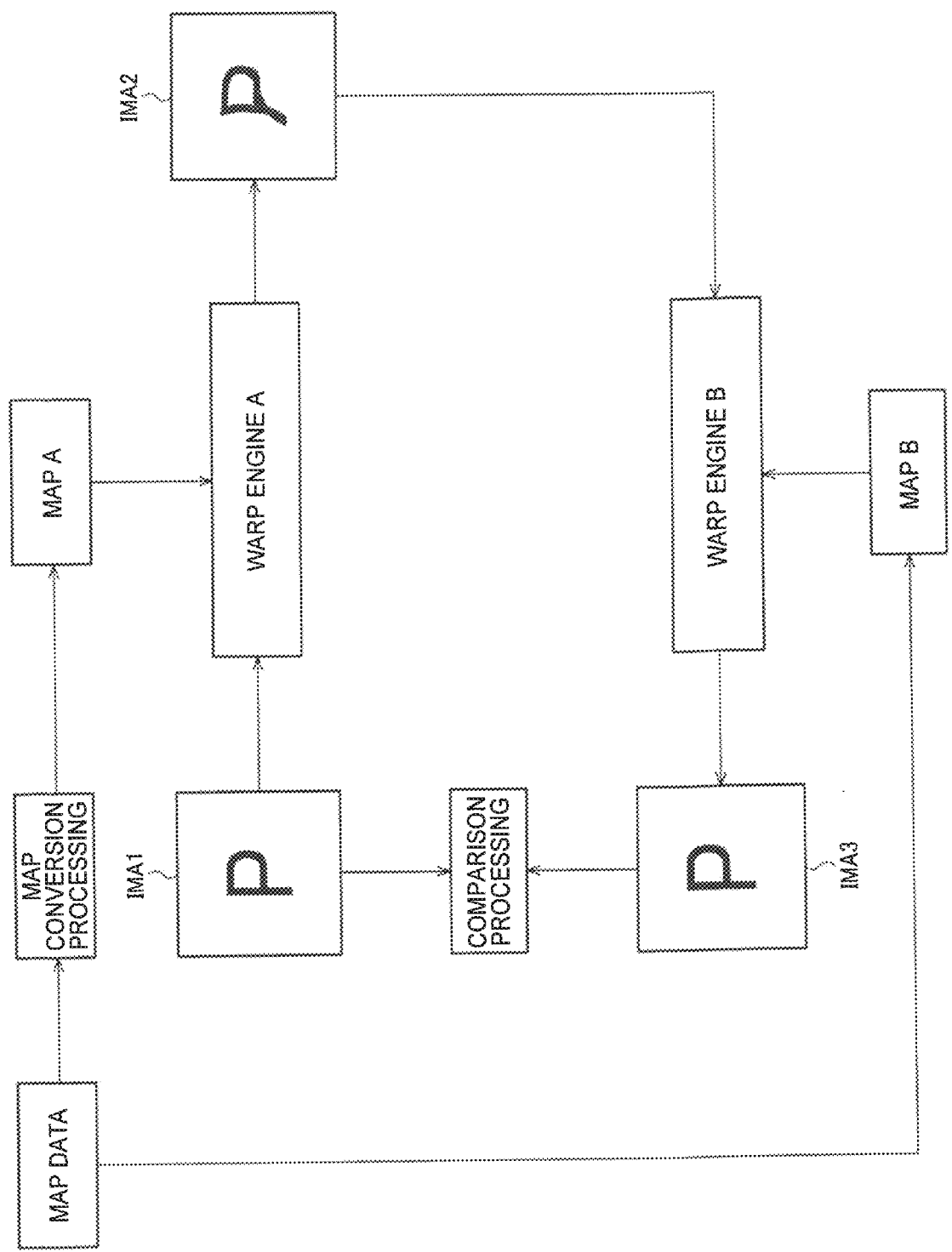
FIG. 3 is a diagram schematically illustrating operations of the circuit device in the first exemplary configuration.

Next, operations of the circuit device 100 in FIG. 1 will be described. FIG. 3 is a diagram schematically illustrating operations of the circuit device 100 in FIG. 1.

As shown in FIG. 3, a map A is generated by performing map conversion processing on reference map data, and the reference map data is used as a map B. Specifically, the nonvolatile memory 210 shown in FIG. 1 stores the reference map data, and the processing device 200 reads out the reference map data from the nonvolatile memory 210, and performs map conversion processing on the reference map data so as to generate the map data MPA1 associated with the map A. The map data MPA1 is input to the mapping processing unit WEA1 via the interface 190. The map conversion processing is conversion between the forward map and the reverse map, rotation of the map, parallel translation of the map, or the like. Also, the processing device 200 outputs the reference map data as the map data MPA2 associated with the map B. The map data MPA2 is input to the mapping processing unit WEA2 via the interface 190.

The warp engine A corresponds to the mapping processing unit WEA1, and performs mapping processing on the image IMA1 using the map A so as to generate the image IMA2. The mapping processing is also referred to as a warp processing. Also, the warp engine B corresponds to the mapping processing unit WEA2, and performs reverse mapping processing on the image IMA2 using the map B so as to generate the image IMA3. This reverse mapping processing may include rotational transformation and parallel translation of an image corresponding to reverse conversion of the rotation and the parallel translation of the map in the map conversion processing.

The warp engine A generates the image IMA2 for display, and therefore, performs high quality mapping processing relative to the warp engine B. For example, high-resolution mapping processing that adapts to the display resolution is performed. Also, interpolation processing of pixel values is performed in order to secure the display quality. On the other hand, the warp engine B generates the image IMA3 for error detection, and therefore, performs simplified mapping processing relative to the warp engine A. For example, as a result of thinning the pixels that are the target of the coordinate conversion, a low resolution image IMA3 relative to the image IMA1 is generated. Also, the interpolation processing of the pixel values may be omitted.

In the comparison processing performed by the comparison circuit 145, thinning processing is performed on the image IMA1, as will be described later, positioning of the pixels in the images IMA1 and IMA3 is performed, and an index is obtained from the images subjected to the positioning.

In the operations described above, the map A is generated by performing map conversion processing on the reference map data. Therefore, when an abnormality occurs in the map A due to an error in the map conversion processing, it is possible that an abnormality will occur in the image IMA2 generated by the warp engine A using the map A. Also, even if there is no abnormality in the map A, when an abnormality occurs in the mapping processing performed by the warp engine A, it is possible that an abnormality will occur in the image IMA2 generated by the warp engine A. In order to detect such an abnormality, an error needs to be detected in an image deformed by the warp engine A, and it is difficult to perform error detection using a known technology. For example, in the case where a data error detection technique such as CRC or the like is used, the CRC value of an image before conversion that is to be performed thereon by the warp engine A is used as the reference, and therefore the CRC value does not match, in principle, the CRC value obtained from the image subjected to the conversion performed by the warp engine A.

In the present embodiment, reverse mapping processing is performed on the image IMA2 by the warp engine B, and the image IMA3 subjected to the reverse mapping processing and the original image IMA1 are compared so as to obtain an index representing the degree of matching. When there is no abnormality in the map A and the warp engine A, the degree of matching between the images IMA3 and IMA1 is high, and therefore an error in the image IMA2 can be detected using the index. Note that the index has a value that changes according to the degree of matching, and therefore the images IMA1 and IMA3 need not be completely matched. That is, even if there is a minute abnormality in the map A or the warp engine A, if the error is to a degree such that the image IMA2 can be visually recognized by a user, no-error may be determined. For example, the index is judged using a threshold value in the error detection, and as a result of setting the threshold value, the degree of matching at which an error is determined can be adjusted.

Figure 4:
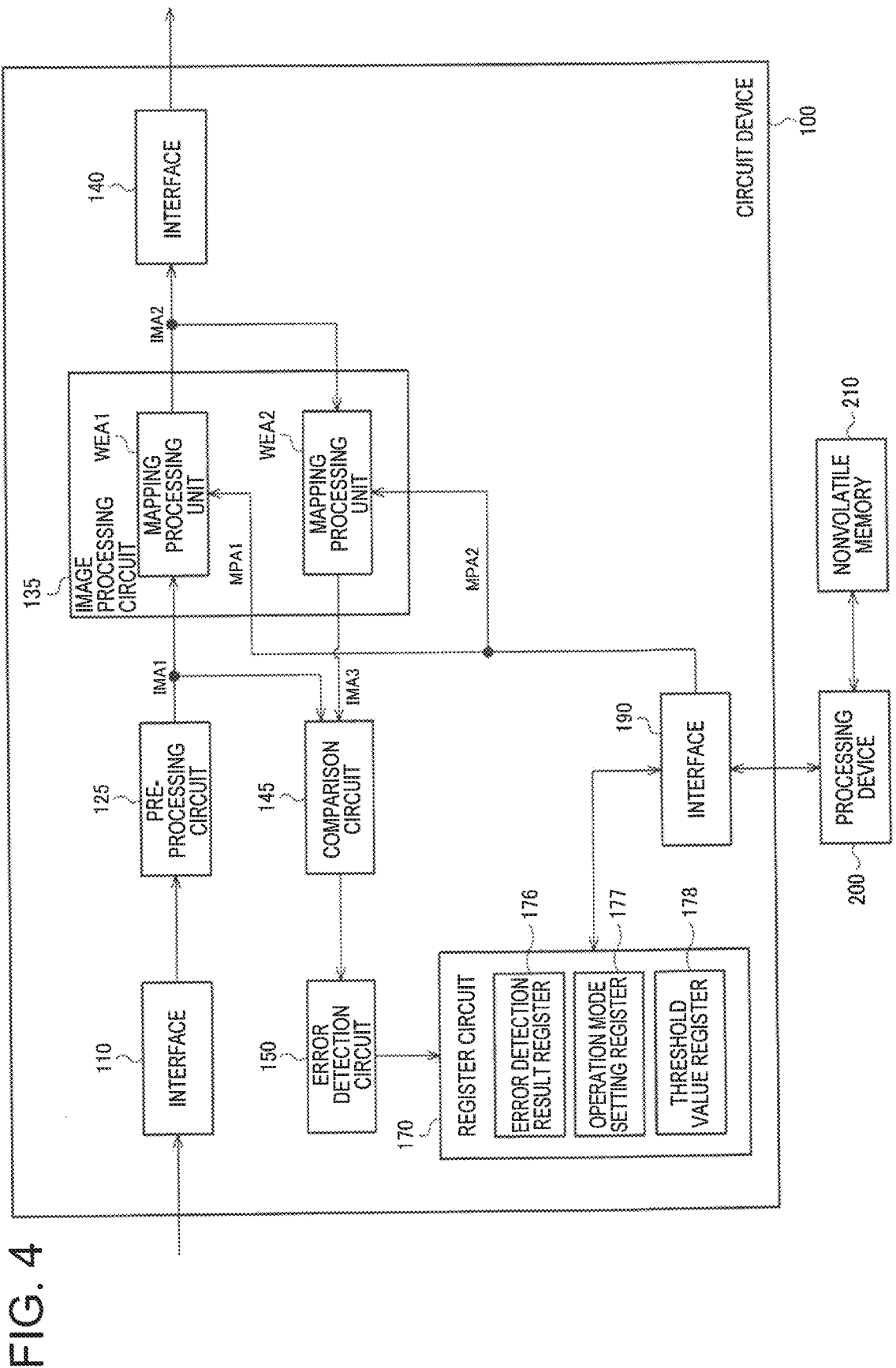
FIG. 4 shows a second exemplary configuration of the circuit device of the present embodiment.

FIG. 4 shows a second exemplary configuration of the circuit device of the present embodiment. In FIG. 4, the circuit device 100 includes the error detection circuit 150. Also, the register circuit 170 includes an error detection result register 176, an operation mode setting register 177, and a threshold value register 178. Note that the constituent elements that are the same as the constituent elements that have already been described will be denoted by the same reference signs, and the description thereof will be omitted, as appropriate.

The comparison circuit 145 outputs a result of comparison between the images IMA1 and IMA3 to the error detection circuit 150. The error detection circuit 150 performs error detection on the image IMA2 for display based on the comparison result. When the comparison result is the index described above, the error detection circuit 150 performs the error detection by comparing the index with a threshold value. The threshold value with respect to the shape index is a threshold value that indicates an allowable similarity. The threshold value with respect to the visibility index is a threshold value that indicates allowable visibility.

When the error detection circuit 150 detects an error, the image processing circuit 135 stops outputting an image IMA2 to the interface 140. Alternatively, when the error detection circuit 150 detects an error, the interface 140 stops outputting an image IMA2. The interface 140 outputs an image IMA2 along with error information, and the display driver that has received the error information may perform an operation based on the error information. The error information is an error determination flag, an index, or the like, for example. The operation based on the error information is stopping display or the like, for example.

The error detection result register 176 stores an error detection result output from the error detection circuit 150. The error detection result is an error determination flag that indicates whether or not an error has been determined with respect to a display image, for example.

Mode setting information is set into the operation mode setting register 177 from the processing device 200 via the interface 190. The mode setting information is information regarding the operation mode to be set in the circuit device 100 when the error detection result indicates an error, and is Information regarding the operation to be performed when an error is detected. The image processing circuit 135 performs the operation that is to be performed at the time when an error is detected based on the mode setting information. Note that the configuration may be such that the operation that is to be performed at the time when an error is detected is performed by the processing device 200. In this case, the processing device 200 reads out the error detection result from the error detection result register 176 via the interface 190. The processing device 200 performs the operation that is to be performed at the time when an error is detected if the error detection result indicates an error. The operation that is to be performed at the time when an error is detected is to stop transmitting image data to the circuit device 100, to transmit predetermined image data to the circuit device 100, or the like, for example. The predetermined image data is image data of an image to be displayed to a user when an error is detected.

A threshold value is set into the threshold value register 178 from the processing device 200 via the interface 190. The error detection circuit 150 performs error detection by comparing the index and the threshold value set into the threshold value register 178. That is, the error detection circuit 150 compares the shape index with a shape index threshold value, compares the visibility index with a visibility index threshold value, performs error detection based on the comparison results, and outputs the result as the error detection result. For example, if at least one of the comparison results indicates an error, it is determined that the second image includes an error.

In the configuration shown in FIG. 4 as well, similarly to the configuration shown in FIG. 1, as a result of comparing the image IMA3 with the image IMA1, an error in the image IMA2 subjected to the mapping processing that is to be projected onto the projection target object can be detected based on the result of comparison.

Note that, although a case where the circuit device 100 outputs the error detection result to the processing device 200 has been described above, the configuration may be such that the circuit device 100 does not output the error detection result to a device external to the circuit device 100, and may use the error detection result only inside the circuit device 100. For example, when an error is detected, the circuit device 100 may shift to a safe mode. In the safe mode, control such that a predetermined error notification image is transmitted to a display driver, or a backlight of a liquid-crystal display device is turned off, for example, may be performed. Accordingly, an error state can be directly reported to a user not by the control from the processing device 200, but by the control from the circuit device 100.

A head up display controller that controls a head up display or a display controller that controls a display driver can be envisioned as the circuit device 100 in FIG. 1 or 4 described above. Note that the circuit device to which the method of the present embodiment can be applied is not limited thereto. For example, the circuit device may be a display driver that includes a function of the display controller. In the case where the circuit device is a head up display controller, a display controller, or a display driver, the circuit device is an integrated circuit device (IC), for example. Note that the circuit device may include a plurality of integrated circuit devices. For example, the circuit device includes a head up display controller, which is a first integrated circuit device, and a processing device, which is a second integrated circuit device. In this case, the head up display controller includes a comparison circuit that performs processing of comparing between the images IMA1 and IMA3, and the processing device includes an error detection circuit that performs error detection based on a result of comparison received from the head up display controller.

Figure 5:
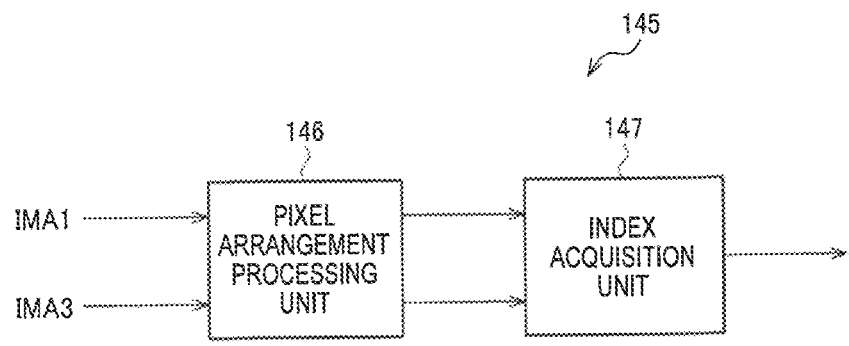
FIG. 5 shows a detailed exemplary configuration of a comparison circuit.

FIG. 5 shows a detailed exemplary configuration of the comparison circuit 145. The comparison circuit 145 includes a pixel arrangement processing unit 146 and an index acquisition unit 147.

The pixel arrangement processing unit 146 performs pixel arrangement processing for performing comparison between the images IMA1 and IMA3, and outputs the images IMA1 and IMA3 subjected to the processing to the index acquisition unit 147. Since the resolution of the image IMA3 is lower than that of the image IMA1, as described above, the comparison circuit 145 reduces the resolution of the image IMA1 so as to match the resolution of the image IMA3, and compares the image IMA3 with the image IMA1 whose resolution has been reduced. For example, the pixel arrangement processing unit 146 performs subsampling processing on the image IMA1 such that the number of pixels of the image IMA1 matches the number of pixels of the image IMA3. Also, rotation processing, translational processing, interpolation processing, and the like may be performed such that corresponding pixels of the images IMA1 and IMA3 are arranged at the same pixel positions.

The index acquisition unit 147 obtains an index for detecting an error in the image IMA2 based on the images IMA1 and IMA3 subjected to the pixel arrangement processing. As descried above, the index is a shape index, and a visibility index may further be acquired. The details of the shape index and the visibility index will be described later. The index output from the index acquisition unit 147 is stored in the comparison result register 175 as information regarding the comparison result. Alternatively, the error detection circuit 150 performs error detection based on the index.

According to the embodiment described above, the image processing circuit 135 performs first mapping processing, which is processing of mapping an input first image to a second image to be projected onto a projection target object, and second mapping processing for converting the second image to a third image, which is reverse mapping processing of the first mapping processing. The comparison circuit 145 performs comparison between the first image and the third image, and outputs the result of comparison as information for performing error detection on the second image.

In FIGS. 1 to 5, IMA1 indicates the first image, IMA2 indicates the second image, and IMA3 indicates the third image. Also, the mapping processing performed by the mapping processing unit WEA1 is the first mapping processing, and the mapping processing performed by the mapping processing unit WEA2 is the second mapping processing. The information for performing the error detection is information regarding the result of comparison between the images IMA1 and IMA3, and corresponds to the later-described shape index or visibility index, or the shape index and the visibility index, for example.

As described in FIG. 3 and the like, when an abnormality occurs in the mapping processing or the map data, an abnormality occurs in the second image, but it is difficult to detect the abnormality using a known technique. In this regard, according to the present embodiment, as a result of converting the second image to the third image by performing the reverse mapping processing of the first mapping processing in the second mapping processing, the first image and the third image can be compared. Since the third image is generated from the second image, it can be determined that there is no error in the second image, if the degree of matching between the third image and the first image, which is the reference, is high. In this way, whether the image to be projected onto a projection target object such as a head up display, for example, has appropriate display content can be detected.

Also, in the present embodiment, the comparison circuit 145 obtains an index representing the degree of matching between the first image and the third image, as the result of comparison, based on the pixel values of the first image and the pixel values of the third image, or based on the pixel values of an edge image of the first image and the pixel values of an edge image of the third image.

Here, the pixel value of an edge image indicates an edge amount of the corresponding pixel, and is a signal value obtained by performing edge extraction. The index representing the degree of matching is the shape index, and the details thereof will be described later.

In this way, an error in the third image can be detected based on the index representing the degree of matching between the first image and the third image without performing bit-wise error detection such as CRC. If an error is not detected in the third image, it can be determined that the mapping processing has been properly performed, and therefore, an error in the second image that is generated through mapping processing can be detected. For example, an icon and the like to be presented to a user are displayed in an in-vehicle head up display or the like. According to the present embodiment, such an icon can be displayed to the user as long as the shape thereof can be properly recognized, without stopping display due to one-bit error or the like.

Also, in the present embodiment, the image processing circuit 135 performs the first mapping processing using first map data generated from map data associated with the projection target object, and performs the second mapping processing using second map data, which is the map data.

In FIGS. 1 to 4, the map data associated with the projection target object is map data stored in the nonvolatile memory 210. The first map data is the map data MPA1, and is the data of the map A generated through the map conversion processing. The second map data is the map data MPA2, and data of the map B, which is map data read out from the nonvolatile memory 210.

In the case where the first map data is generated from the map data associated with the projection target object, if an abnormality occurs in the processing, there is a risk that an abnormality will occur in the second image subjected to the mapping processing using the first map data. According to the present embodiment, the third image, which is an image used for comparison, is generated using reference map data as the second map data as is. Accordingly, as a result of performing comparison between the third image and first image, whether or not the first mapping processing using the first map data has been properly performed can be determined.

Also, in the present embodiment, the circuit device 100 includes the error detection circuit 150 that performs error detection on the second image based on the result of comparison performed by the comparison circuit 145.

In this way, the error detection circuit 150 incorporated in the circuit device 100 can perform error detection on the display image. Also, the circuit device 100 can perform an operation that is to be performed at the time when an error has been detected based on the error detection result. Alternatively, the error detection result is output to the processing device 200 and the like, and the processing device 200 and the like can perform an operation that is to be performed at the time when an error has been detected based on the error detection result.

Also, in the present embodiment, the circuit device 100 includes the operation mode setting register 177 in which the operation mode of the circuit device 100 when an error is determined by the error detection circuit 150 is set.

In this way, the operation mode of the circuit device 100 when an error is determined in the second image based on the result of comparison between the first image and the second image can be set into the operation mode setting register 177 via an interface. For example, the processing device 200 can set an operation mode in the operation mode setting register 177 via the interface 190. For example, the circuit device 100 can be caused to perform an operation desired by a user at the time when an error is detected, for example.

Also, in the present embodiment, a mode of reporting the result of error detection to an external device external to the circuit device 100, a mode of the second image being not displayed, and a mode of displaying a specific image are set as operation modes in the operation mode setting register 177.

The external device is the processing device 200, for example, which is an SoC, a CPU, or the like. The result of error detection is output to the external device via the interface 190, for example. Note that, with some interface, the circuit device 100 cannot transmit a notification to the processing device 200. In this case, the circuit device 100 interrupts the processing device 200 to perform notification, and the processing device can read out detailed information from the circuit device via the interface. An image being not displayed is to set the display panel to a state in which an image is not displayed, and is to cause the display panel to display black or white over the entire display region, for example. The specific image is an image that is different from the display image, which is the target of the error detection, and is an image desired to be displayed when an error is detected. For example, the specific image is an image in which a message, a symbol, a color, or the like that is desired to be presented to the user when an error is detected is displayed, for example. In the case of color, a predetermined color such as red is displayed in the entirety of or a portion of the display region of the display panel, for example.

In this way, the operation mode of the circuit device 100 when an error has been determined in the second image can be set to one of the above-described three modes. For example, the circuit device 100 can be caused to perform one of the above-described three modes, as the operation desired by the user when an error is detected.

Also, in the present embodiment, the error detection circuit 150 performs error detection by comparing the result of comparison with a threshold value for determining an error in the second image.

In FIG. 4, the threshold value for determining an error in the second image is a threshold value to be compared with the index, which is the comparison result.

In CRC, whether or not an error has occurred in the image data is detected by comparing a CRC value received along with the image data and a CRC value computed from the received image data. On the other hand, the index, which is the result of comparison, in the present embodiment is not only an index that simply indicates whether or not there is an error, but is also an index whose value changes according to the degree of matching between the first image and the third image. As a result of comparing the index with a threshold value, error detection can be performed even in a case where a data error detection method such as CRC cannot be used. That is, an error can be determined when it is determined that the similarity of the shapes cannot be secured based on the degree of matching.

Also, in the present embodiment, the circuit device 100 includes the threshold value register 178 in which threshold values are set.

In this way, a threshold value to be compared with an index, which is the result of comparison, can be set into the threshold value register 178 via an interface. For example, the processing device 200 can set a threshold value to the threshold value register 178 via the interface 190. As a result of setting the threshold value such that the value thereof can be changed, the degree of similarity between shapes at which an error is determined can be changed. As a result of providing the threshold value register 178, a user can freely set the threshold value, which is an error determination criterion, for example.

2. Third and Fourth Exemplary Configurations

Figure 6:
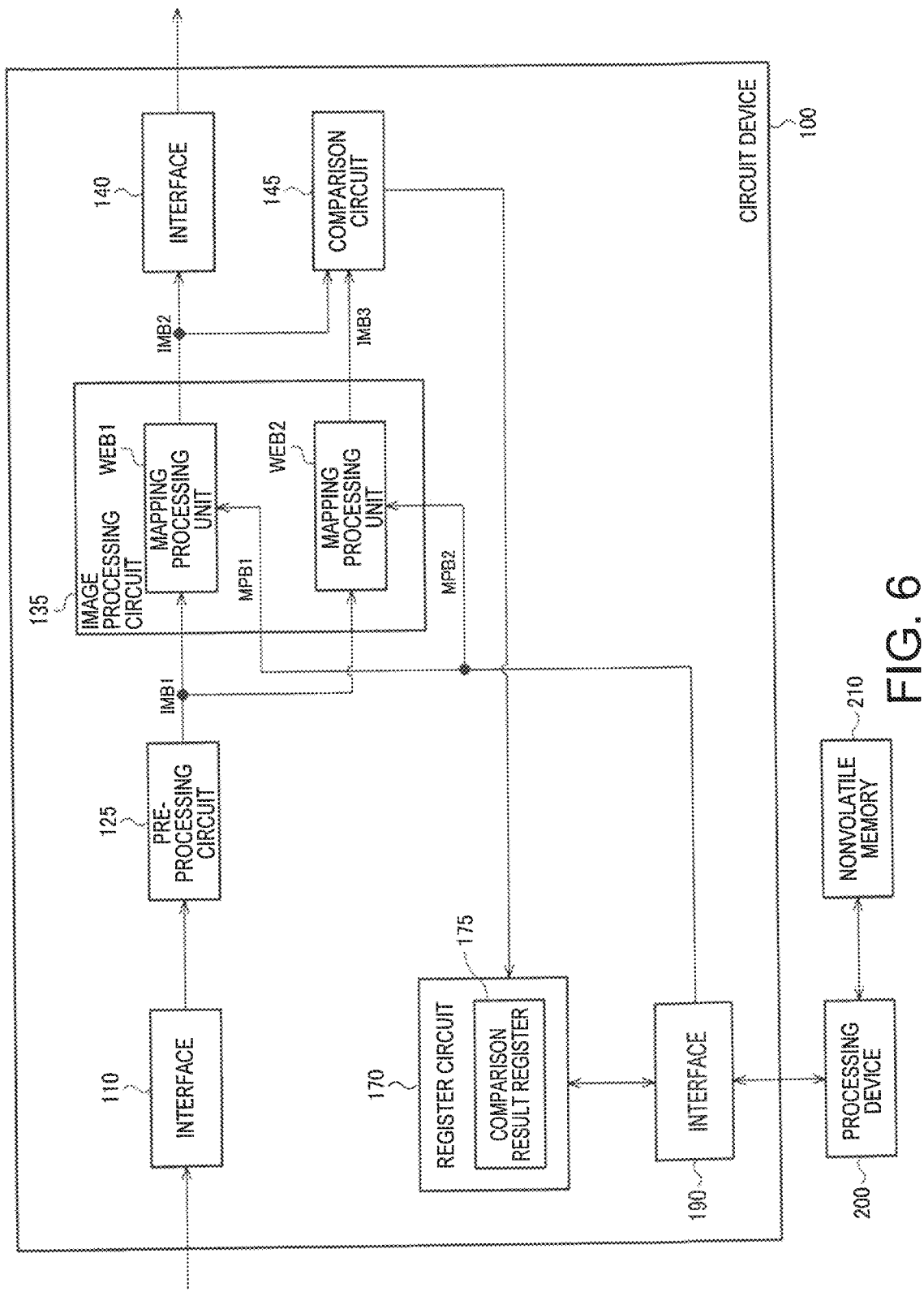
FIG. 6 shows a third exemplary configuration of the circuit device of the present embodiment.

FIG. 6 shows a third exemplary configuration of the circuit device of the present embodiment. In FIG. 6, the image processing circuit 135 includes a mapping processing unit WEB1 that maps an image so as to conform to the surface shape of a projection target object, and a mapping processing unit WEB2 that performs mapping in the same direction. Also, the comparison circuit 145 compares images IMB2 and IMB3 that are respectively output from the mapping processing units WEB1 and WEB2. Note that the constituent elements that are the same as the constituent elements that have already been described will be denoted by the same reference signs, and the description thereof will be omitted, as appropriate.

The pre-processing circuit 125 outputs an image IMB1 subjected to pre-processing. The content of the pre-processing is similar to the content described in FIG. 1.

The mapping processing unit WEB1 performs mapping processing on the image IMB1 output from the pre-processing circuit 125 using map data MPB1, and outputs the image IMB2 subjected to the mapping processing. This mapping processing is similar to the mapping processing performed by the mapping processing unit WEA1 in FIG. 1. The mapping processing unit WEB2 performs mapping processing on the image IMB1 output from the pre-processing circuit 125 using map data MPB2, and outputs the image IMB3 subjected to the mapping processing. This mapping processing is processing of mapping an image so as to conform to the surface shape of the projection target object, but need not be the same as the mapping processing performed by the mapping processing unit WEB1. That is, at least one of the map data and the mapping processing may be different from those of the mapping processing unit WEB1. For example, the mapping processing unit WEB2 generates a low resolution image IMB3 relative to the image IMB2. Also, the interpolation processing of the pixel values may be omitted.

The comparison circuit 145 performs processing of comparing between the image IMB2 and the image IMB3, and outputs the result of comparison. This result of comparison is used for detecting an error in the image IMB2. That is, the result of comparison is used for verifying whether or not the map data MPB1 is normal and the mapping processing has been properly performed by the mapping processing unit WEB1. Specifically, the comparison circuit 145 obtains an index that represents the degree of matching between the image IMB2 and the image IMB3. This index corresponds to the later-described shape index. Alternatively, the later-described visibility index may be obtained as the index.

The register circuit 170 includes the comparison result register 175 for storing comparison result information output from the comparison circuit 145. The processing device 200 performs error detection based on comparison result information read out from the comparison result register 175 via the interface 190. The error detection performed on the image IMB2 to be projected onto a projection target object is realized by the above-described image comparison and error detection. That is, whether or not the mapping processing has been properly performed by the mapping processing unit WEB1 is detected.

Figure 7:
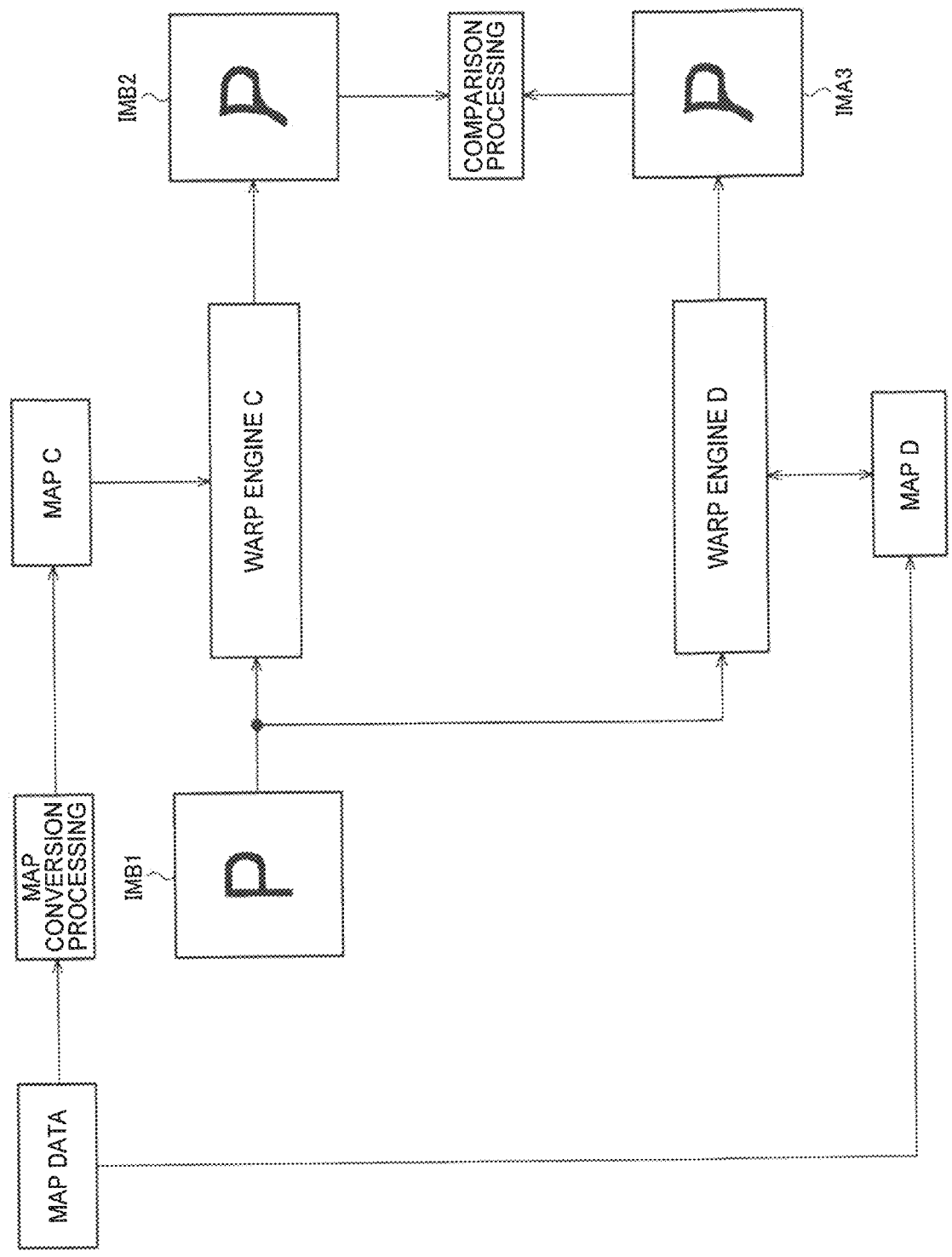
FIG. 7 is a diagram schematically illustrating operations of the circuit device in the third exemplary configuration.

Next, operations of the circuit device 100 in FIG. 6 will be described. FIG. 7 is a diagram schematically illustrating the operations of the circuit device 100 in FIG. 6.

As shown in FIG. 7, map conversion processing is performed on reference map data so as to generate a map C, and the reference map data is used as a map D. Specifically, the nonvolatile memory 210 shown in FIG. 6 stores the reference map data, and the processing device 200 reads out the reference map data from the nonvolatile memory 210, performs map conversion processing on the reference map data so as to generate map data MPB1 associated with the map C. The map data MPB1 is input to the mapping processing unit WEB1 via the interface 190. Also, the processing device 200 outputs the reference map data as map data MPB2 associated with the map D. The map data MPB2 is input to the mapping processing unit WEB2 via the interface 190.

The warp engine C corresponds to the mapping processing unit WEB1, and performs mapping processing on the image IMB1 using the map C so as to generate the image IMB2. Also, the warp engine D corresponds to the mapping processing unit WEB2, and performs mapping processing on the image IMB1 using the map D so as to generate the image IMB3. This mapping processing may include rotational transformation and parallel translation of an image corresponding to the rotation and parallel translation of a map in the map conversion processing.

The warp engine C generates the image IMB2 for display, and therefore, performs high quality mapping processing relative to the warp engine D. For example, high-resolution mapping processing that adapts to the display resolution is performed. Also, interpolation processing of pixel values is performed in order to secure the display quality. On the other hand, the warp engine D generates the image IMB3 for error detection, and therefore, performs simplified mapping processing relative to the warp engine C. For example, as a result of thinning the pixels that are the target of the coordinate conversion, a low resolution image IMB3 relative to the image IMB2 is generated. Also, the interpolation processing of the pixel values may be omitted.

In the comparison processing performed by the comparison circuit 145, thinning processing is performed on the image IMB2, positioning of the pixels in the images IMB2 and IMB3 is performed, and an index is obtained from the images subjected to the positioning. The detailed configuration of the comparison circuit 145 is similar to that shown in FIG. 5. That is, IMA1 and IMA3 in FIG. 5 need only be replaced by IMB2 and IMB3.

In the present embodiment, the warp engine D performs mapping processing in the same direction as the warp engine C, compares the images IMB2 and IMB3 that have been subjected to the mapping processing so as to obtain an index representing the degree of matching. When there is no abnormality in the map C and the warp engine C, the degree of matching between the images IMB2 and IMB3 is high, and therefore an error in the image IMB2 can be detected using the index. Note that the index has a value that changes according to the degree of matching, and therefore the images IMB2 and IMB3 need not be completely matched. That is, even if there is a minute abnormality in the map C or the warp engine C, if the error is to a degree such that the image IMB2 can be visually recognized by a user, no-error may be determined.

Figure 8:
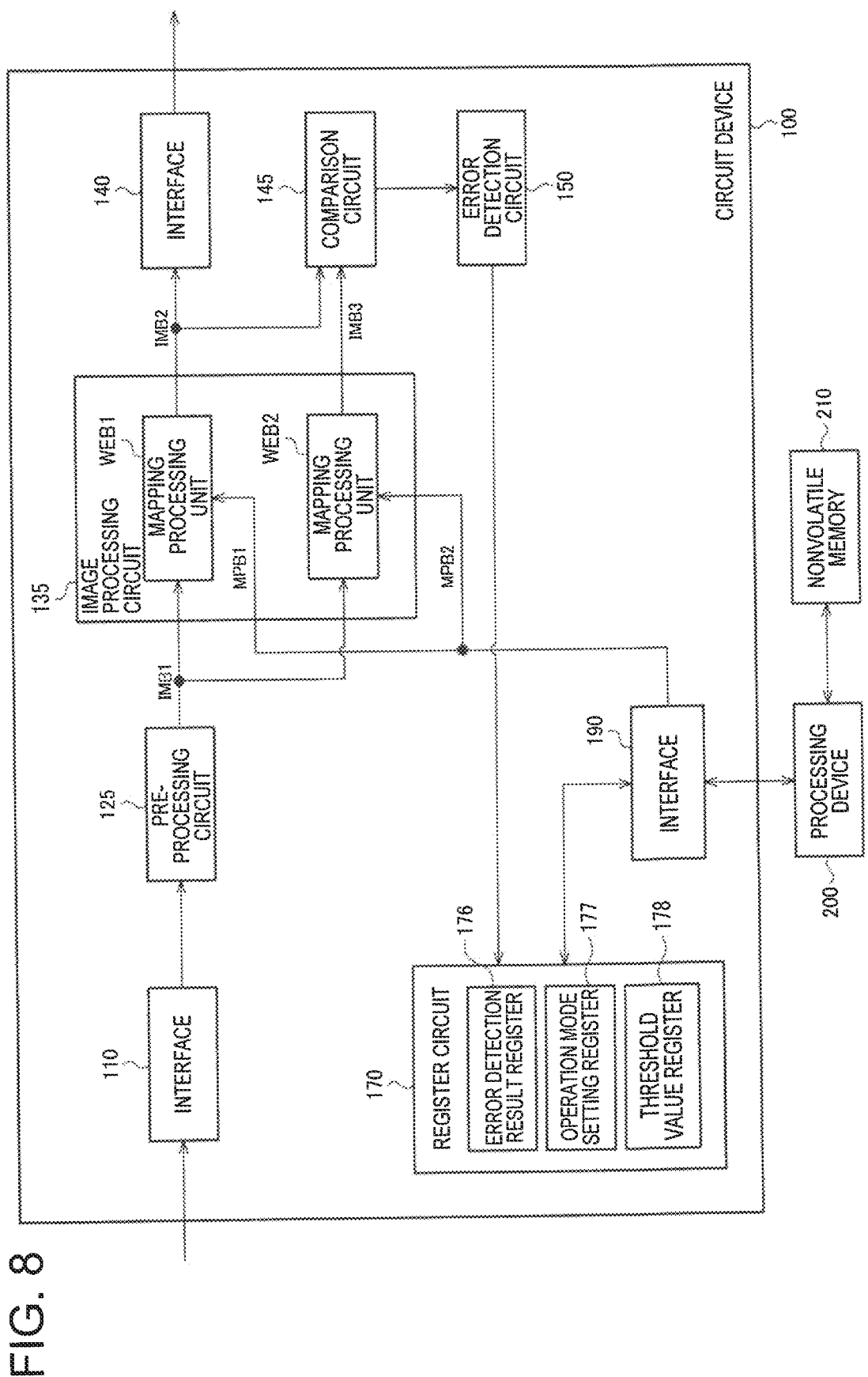
FIG. 8 shows a fourth exemplary configuration of the circuit device of the present embodiment.

FIG. 8 shows a fourth exemplary configuration of the circuit device of the present embodiment. In FIG. 8, the circuit device 100 includes the error detection circuit 150. Also, the register circuit 170 includes the error detection result register 176, the operation mode setting register 177, and the threshold value register 178. Note that the constituent elements that are the same as the constituent elements that have already been described will be denoted by the same reference signs, and the description thereof will be omitted, as appropriate.

The comparison circuit 145 outputs the result of comparison between the images IMB2 and IMB3 to the error detection circuit 150. The error detection circuit 150 performs error detection on the image IMB2 for display based on the result of comparison. In the case where the result of comparison is the above-described index, the error detection circuit 150 performs the error detection by comparing the index with a threshold value.

In the configuration shown in FIG. 8 as well, similarly to the configuration shown in FIG. 6, as a result of performing comparison between the images IMB2 and IMB3, an error in the image IMB2 subjected to mapping processing that is to be projected onto a projection target object can be detected based on the result of comparison.

Note that, although a case where the circuit device 100 outputs the error detection result to the processing device 200 has been described above as an example, the configuration may be such that the circuit device 100 does not output the error detection result to a device external to the circuit device 100, and may use the error detection result only inside the circuit device 100.

A head up display controller that controls a head up display and a display controller that controls a display driver are envisioned as the circuit device 100 in FIG. 6 or 8. Note that the circuit device to which the present embodiment can be applied is not limited thereto. For example, the circuit device may be a display driver that includes a function of the display controller. In the case where the circuit device is a head up display controller, a display controller, or a display driver, the circuit device is an integrated circuit device (IC), for example. Note that the circuit device may include a plurality of integrated circuit devices. For example, the circuit device includes a head up display controller, which is a first integrated circuit device, and a processing device, which is a second integrated circuit device. In this case, the head up display controller includes a comparison circuit that performs processing of comparing between the images IMB2 and IMB3, and the processing device includes an error detection circuit that performs error detection based on the result of comparison received from the head up display controller.

According to the above-described embodiment, the image processing circuit 135 performs the first mapping processing, which is processing of mapping an input first image on a second image to be projected onto a projection target object, based on map data associated with the projection target object, and the second mapping processing in which the first image is converted to a third image by the second mapping processing that is different from the first mapping processing. The comparison circuit 145 performs comparison between the second image and the third image, and outputs the result of comparison as information for performing error detection on the second image.

In FIGS. 6 to 8, IMB1 indicates the first image, IMB2 indicates the second image, and IMB3 indicates the third image. Also, the mapping processing performed by the mapping processing unit WEB1 is the first mapping processing, and the mapping processing performed by the mapping processing unit WEB2 is the second mapping processing. The information for performing the error detection is the information regarding the result of comparison between the images IMB2 and IMB3, and corresponds to the later-described shape index or visibility index, or the shape index and the visibility index, for example.

Here, the first and second mapping processing being different means that the hardware or the algorithm is different therebetween. For example, in FIGS. 6 and 8, the mapping processing units WEB1 and WEB2 may be constituted by separate mapping processing circuits. Alternatively, the first and second mapping processing being different means that at least one of the map data and the content of the mapping processing is different therebetween. For example, as described in FIG. 7, the map C used by the warp engine C that handles the first mapping processing is obtained by performing map conversion processing on the reference map data, and the map D used by the warp engine D that handles the second mapping processing may be the reference map data itself. Alternatively, the first mapping processing is one of forward mapping and reverse mapping, and the second mapping processing is the other thereof. Alternatively, the first and second mapping processing may be mapping processing having different resolution. Alternatively, the first mapping processing may include interpolation processing, and the second mapping processing may not include interpolation processing.

According to the present embodiment, the first image is converted to the second and third images by being respectively subjected to the first mapping processing and second mapping processing. The first mapping processing and second mapping processing are each mapping processing in the same direction that performs similar deformation on the first image. Accordingly, the second image and the third image can be compared. If the degree of matching between the second image and the third image is high, it can be determined that there is no error in the second image. In this way, it can be detected whether the image to be projected onto a projection target object such as a head up display has appropriate display content, for example. Also, since the second mapping processing is mapping processing that is different from the first mapping processing, the occurrence of the same abnormality both in the first mapping processing and second mapping processing can be avoided, and error detection accuracy can be improved.

Also, in the present embodiment, the comparison circuit 145 obtains an index representing the degree of matching between the second image and the third image, as the result of comparison, based on the pixel values of the second image and the pixel values of the third image, or based on the pixel values of an edge image of the second image and the pixel values of an edge image of the third image.

In this way, an error in the second image can be detected based on the index representing the degree of matching between the second image and the third image without performing bit-wise error detection such as CRC. If an error is not detected in this processing, it can be determined that the mapping processing has been properly performed, and therefore, an error in the second image that is generated through mapping processing can be detected. For example, an icon and the like to be presented to a user are displayed in an in-vehicle head up display or the like. According to the present embodiment, such an icon can be displayed to the user as long as the shape thereof can be properly recognized, without stopping display due to one-bit error or the like.

Also, in the present embodiment, the image processing circuit 135 performs the first mapping processing using the first map data generated from map data that is associated with the projection target object, and performs the second mapping processing using the second map data, which is the map data.

In FIGS. 6 to 8, the map data associated with the projection target object is map data stored in the nonvolatile memory 210. The first map data is the map data MPB1, and is the data of map C generated by performing map conversion processing. The second map data is the map data MPB2, and is the data of map D, which is map data read out from the nonvolatile memory 210.

According to the present embodiment, the reference map data is used as the second map data as is, and the third image used for comparison is generated. Accordingly, it can be determined whether or not the first mapping processing using the first map data has been properly performed based on the result of comparison between the third image and the second image.

Also, in the present embodiment, the image processing circuit 135 generates the third image whose resolution is low relative to the first image and the second image. The comparison circuit 145 reduces the resolution of the second image so as to match the resolution of the third image, and compares the second image subjected to the resolution reduction with the third image.

In the case where the configuration shown in FIG. 5 is applied to the comparison circuit 145 shown in FIGS. 6 and 8, the pixel arrangement processing unit 146 reduces the resolution of the second image so as to match the resolution of the third image, and the index acquisition unit 147 obtains the index by comparing the second image subjected to the resolution reduction with the third image.

According to the present embodiment, as a result of reducing the resolution of the third image, with which comparison is performed, low resolution mapping processing can be adopted as the second mapping processing for generating the third image. Accordingly, the processing load of the second mapping processing can be reduced, or the circuit scale of the hardware that performs the second mapping processing can be reduced. Also, as a result of reducing the resolution of the second image so as to match the resolution of the third image, the second image can be compared with the third image.

3. Comparison Processing and Error Detection Processing

Hereinafter, the comparison processing performed by the comparison circuit 145 and the error detection processing performed by the error detection circuit 150 will be described. Note that a case where an index is acquired in the comparison processing will be described as an example, and the comparison processing is referred to as index acquisition processing. Note that the comparison processing is not limited thereto, and various types of image comparison can be used.

In an image processing system in which content is displayed in a display, there are cases where whether or not a predetermined region in an image matches the initially intended region needs to be confirmed. For example, a case where an important image is displayed in a cluster display of an automobile system is considered. The cluster display is a meter panel display. Here, there are cases where a predetermined piece of important information needs to be displayed via a visible image overlaid on existing content displayed in a screen. In the following, various methods for detecting whether or not an image is properly displayed will be described. The detection is performed by analyzing a region of interest, and deriving some important indices that indicate the degree of properness in displaying the region. In the present embodiment, the region of interest is the entirety of an image, but a partial region of an image may be the region of interest. Hereinafter, the region of interest is referred to ROI (Region Of Interest) as well.

Note that, hereinafter, an image to be the target of analysis is referred to as an analysis image, and an image to be a reference of the analysis is referred to as a reference image. In FIGS. 1 and 4, the image IMA3 is the analysis image, and the image IMA1 is the reference image. In FIGS. 6 and 8, the image IMB2 is the analysis image, and the image IMB3 is the reference image. Note that the comparison processing is relative comparison between two images, and therefore the analysis image and the reference image may be exchanged.

3.1. First Computation Method of Shape Index (First Index)

The shape index is an index indicating whether or not the shapes of the analysis image and the reference image in a region of interest match. Hereinafter, a computation method of the shape index will be described.

Figure 9:
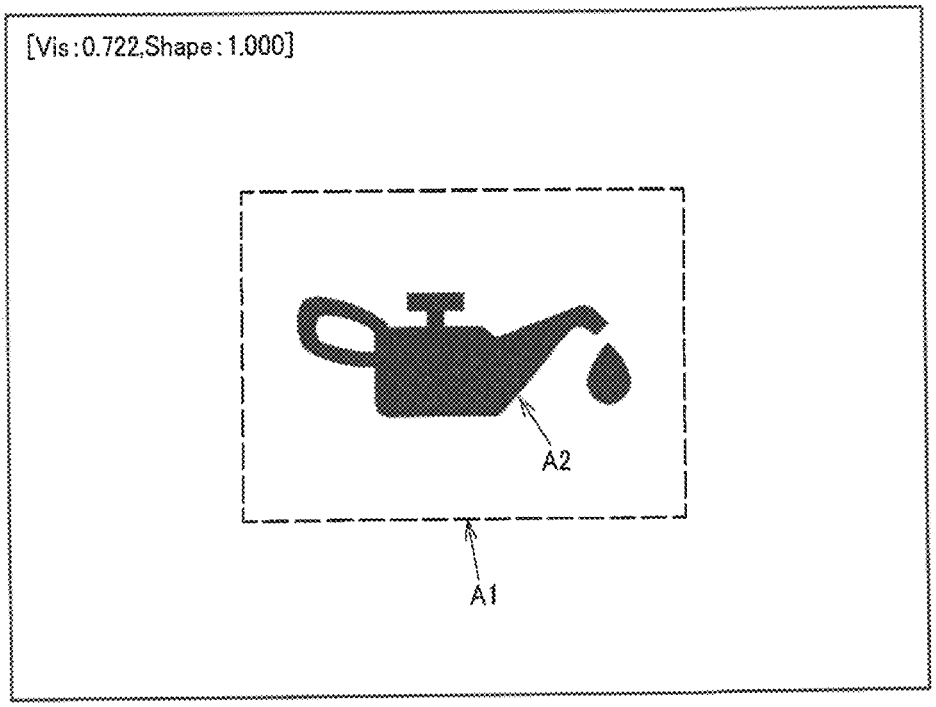
FIG. 9 shows a first example of an analysis image.

FIG. 9 shows a first example of the analysis image. A1 indicates the region of interest, and A2 indicates an icon. Note that the broken line that shows the region of interest is not actually rendered in the display image. Also, here, the region of interest is a portion of the analysis image, but the region of interest may be the entirety of the analysis image.

First, pixel blocks in the ROI of the analysis image are averaged such that the size of the ultimate averaged image is m×n pixels. This subsampling processing is performed such that a small number of pixel errors are not detected as an important error, and the entire shapes of the reference image and the analysis image are confirmed while ignoring these errors. The errors desired to be ignored are color shift, slight distortion, and the like. In order to obtain a complete match, the resolution of the image obtained through subsampling can be increased. The value m×n can be selected according to the application. As will be described later, when used in relation to the reference image, the value m×n is selected based on sample data observation.

When the region of interest of the analysis image includes u×v pixels, the averaging block size is u/m×v/n pixels. When reference background information cannot be used, pixels of a portion of the analysis image in which reference pixels do not exist are deleted. This operation corresponds to reference foreground masking. This is performed because it is necessary that the baseline with respect to background pixels is matched (aligned, put under the same condition) between the reference image and the analysis image. The baseline being matched means being aligned or being put under the same conditions. Therefore, the values of the background pixels are set to the same value both in the analysis image and the reference image.

Figure 10:
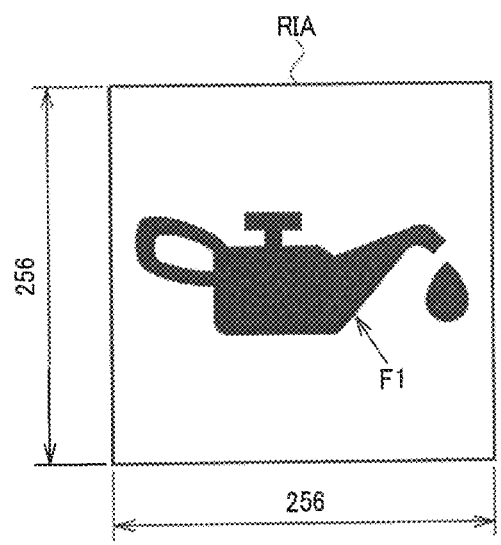
FIG. 10 shows an example of a reference image.
Figure 11:
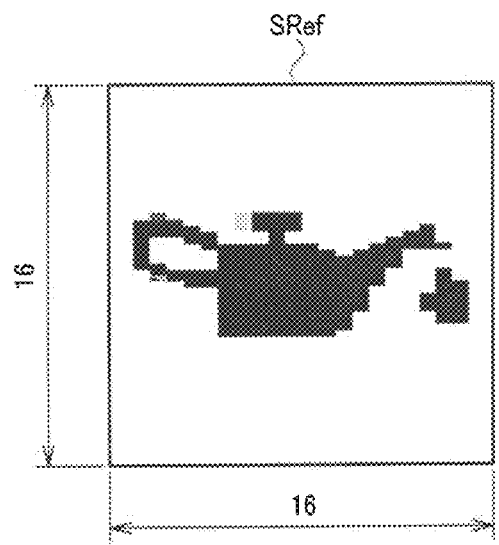
FIG. 11 shows an averaged image of the reference image.

The reference image is also averaged so as to have a size of m×n pixels. Averaging is performed separately on each of the channels. FIG. 10 shows an example of the reference image. A foreground F1, which is an icon of a reference image RIA is colored, and a background, which is a region other than the icon, is not colored, that is black, for example. In FIG. 10, the size of the reference image RIA is 256×256 pixels. FIG. 11 shows an averaged image of the reference image. In FIG. 11, m=n=16, and the size of an averaged image SRef is 16×16 pixels. In the case where the backgrounds of the reference image and its averaged image are not colored, the background of a region of interest of the analysis image may be made colorless, and an averaged image of the image of the region of interest may be obtained. For example, the background may be made colorless by deleting the background.

Next, the averaged image (SRef m×n) of the reference image and the averaged image (SAnz m×n) of the region of interest of the analysis image are compared pixel by pixel using a distance reference, and a distance D is obtained using Equation (1). The distance D is a three-dimensional distance. In the present embodiment, the distance reference is a square of Cartesian distance, but a similar parameter can be obtained with another distance reference.

[Math. 1]

$$D = \sum_{c=1}^{3} \sum_{y=1}^{n} \sum_{x=1}^{m} ([R_{xyc} - R'_c] - [A_{xyc} - A'_c])^2 \quad (1)$$

c represents the channel, x represents the pixel position in the averaged image in a lateral direction, and y represents the pixel position in the averaged image in a longitudinal direction. The lateral direction is also referred to as a horizontal direction, and the longitudinal direction is also referred to as a vertical direction. m and n represent the size of the averaged image. $R_{xyc}$ represents the pixel value at a position (x, y) in the averaged image of the reference image in the channel c. $R'_c$ represents an average value of $R_{xy}$ pixels in the channel c. The average value of the $R_{xy}$ pixels is obtained by averaging the $R_{xyc}$ values inside the averaged image. $A_{xyc}$ represents the pixel value at a position (x, y) in the averaged image of the analysis image in the channel c. $A'_c$ represents an average value of $A_{xy}$ pixels in the channel c. The average value of the $A_{xy}$ pixels is obtained by averaging the $A_{xyc}$ inside the averaged image.

The reason why the average value is subtracted in each channel is to make a small color shift between the reference image and the analysis image to not be treated as an error. When complete matching is required, the average value can be set to 0. In this case, matching of the shape and color is checked using the distance reference.

The shape index S is derived from the distance parameter using the following Equations (2) and (3). The shape index S is also referred to as a shape parameter. T is a threshold value, and can adopt any value. If D<T, T/D=1, the shape index S does not change.

[Math. 2]

$$S = f\left(\frac{T}{D}\right) \quad (2)$$

[Math. 3]

$$D = T \text{ if } D < T \quad (3)$$

The function f is selected so as to be easily implemented by hardware. For example, the function f may be a scaling function K that scales a range from 0 to 1 to a range from 0 to k, for example. In an example described below, the function f is a unit function. That is, S=T/D. The shape index S represents the degree of matching of the shape between the reference image and the analysis image. When the images do not match, this value decreases, and has tendency to become 0. This example will be described in the following.

In FIG. 9, the icon, which is the reference image, is properly displayed in the analysis image. In this case, the shape index S=1, and Shape:1.000 are illustrated in FIG. 9.

Figure 12:
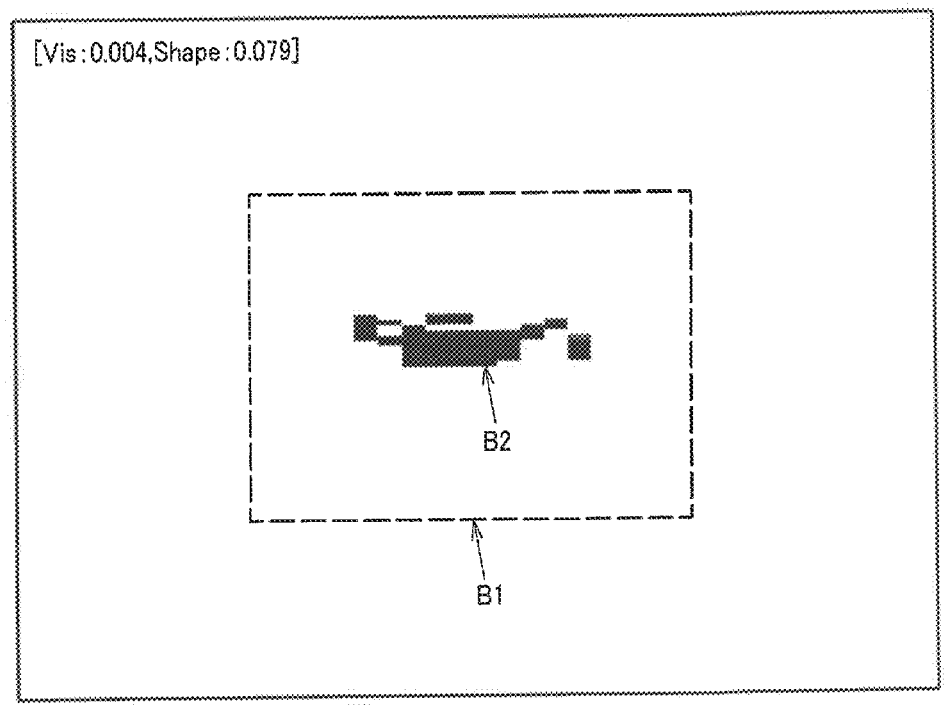
FIG. 12 shows a second example of the analysis image.

FIG. 12 shows a second example of the analysis image. B1 indicates the region of interest. As indicated by B2 in FIG. 12, the icon, which is the reference image, is not clear in the analysis image. That is, some of the reference pixels do not exist in the analysis image, and if the function f is a unit function, the shape index S takes a value of less than one. In the case of such an unclear foreground, the shape index takes a small value. Note that the later-described visibility index also takes a small value.

Figure 13:
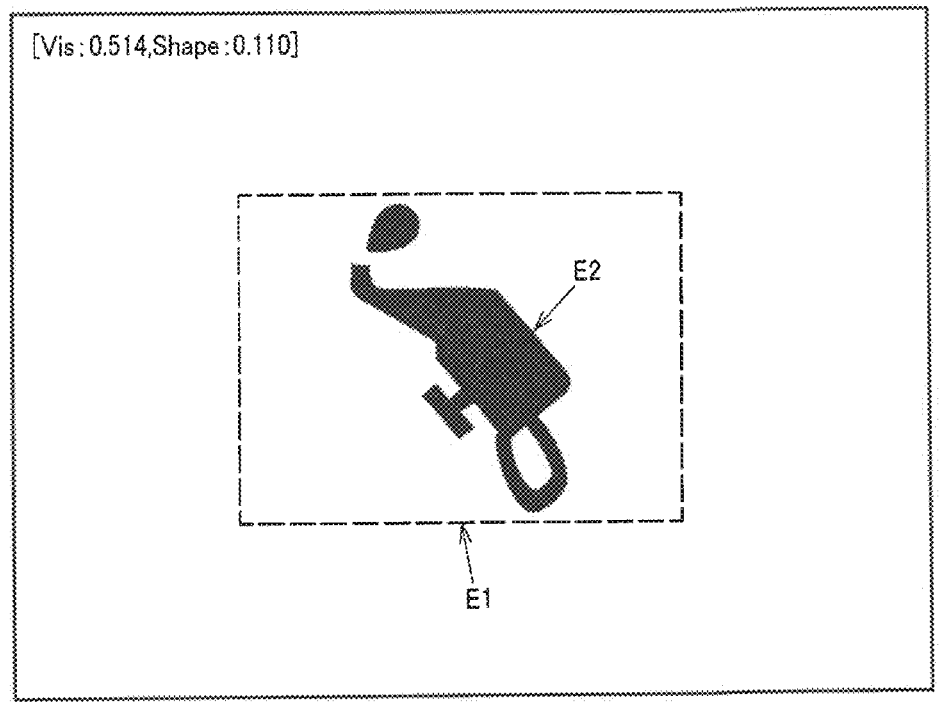
FIG. 13 shows a third example of the analysis image.

FIG. 13 is a third example of the analysis image. E1 indicates the region of interest. As indicated by E2 in FIG. 13, the icon, which is the reference image is rotated in the analysis image. In this example, since the shape is rotated from the reference, if the function f is a unit function, the shape index S takes a value of less than one. When the foreground is rotated in this way, the shape index takes a small value. Note that the later-described visibility index takes a large value. By combining the visibility index, which will be described later, and the shape index, appropriate error detection can be performed in various foreground states, and the accuracy of the error detection can be improved.

The above-described shape index only checks matching in the base signal. In the case of an image whose visibility is low, after generating a first-order gradient image by convoluting an edge detection kernel with the region of interest of the analysis image and the reference image, parameters can be obtained using a shape computation algorithm. The edge detection kernel is Laplacian, Sobel, or the like, for example. Using the obtained parameters, an error in detection that has occurred based on the shape index can be excluded. In this way, even in a case of an image having low visibility, a proper error detection result can be obtained.

3.2. Second Computation Method of Shape Index

Figure 14:
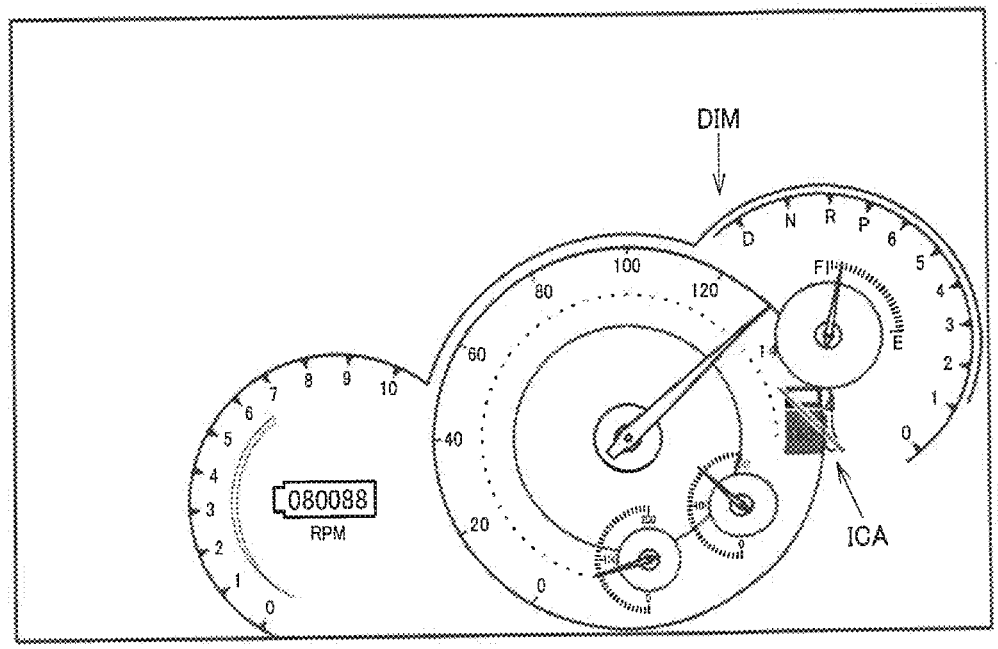
FIG. 14 shows a fourth example of the analysis image.

FIG. 14 shows a fourth example of the analysis image. In FIG. 14, an icon ICA is overlaid on a dashboard image DIM. The icon image is blended with the dashboard image at some transmission factor.

In the present embodiment, edges in the analysis image and the reference image in a region of interest are detected using an edge detection technique. The edge detection technique is an edge detection technique using a Sobel edge detection convolution operator, for example.

Figure 15:
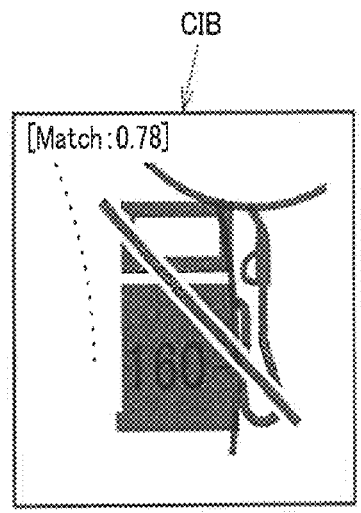
FIG. 15 shows an example of the analysis image in a region of interest.

FIG. 15 shows an example of the analysis image in a region of interest. The display image CIB is an image of the region of interest in which the reference image ICB is blended into the dashboard image DIM. As a result of blending, the dashboard image DIM can be seen through the icon in the icon portion. Note that, if there is no error, the reference image in the region of interest is expected to be an image similar to that in FIG. 15.

Figure 16:
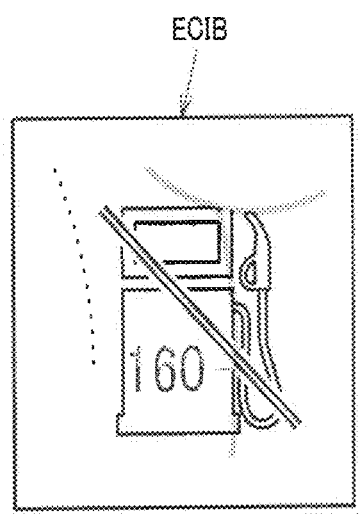
FIG. 16 is an example of edge values calculated from an analysis image.

FIG. 16 is an example of edge values calculated from an analysis image. ECIB indicates an edge image of the image CIB in FIG. 15. For the sake of illustration, edges are shown by black lines and grey lines, but the strength of an edge can be shown in grey scale in actuality. A white portion indicates an edge at high intensity, and a black portion indicates no edge. This edge detection is performed on a luminance channel. Similarly, the edge detection is performed on a color channel or in a color space such as YCbCr as well. Note that, if there is no error, the edge image of the reference image in the region of interest is expected to be an image similar to that in FIG. 16.

Edges in the foreground region and a background region are calculated with respect to the reference image and the analysis image, and the shape index is calculated by calculating a similarity amount as shown in the following Equations (4) to (15). Match in the following Equation (15) is the shape index. The shape index is also referred to as a conformity value. In the following, it is assumed that the reference image has a size of m×n pixels, and the region of interest of the display image has the size of m×n pixels as well.

The following Equation (4) is a horizontal Sobel kernel, which is a Sobel filter operator for detecting edges in a horizontal direction. The following Equation (5) is a vertical Sobel kernel, which is a Sobel filter operator for detecting edges in a vertical direction.

[Math. 4]

$$F_H = \begin{bmatrix} 1 & 0 & -1 \\ 2 & 0 & -2 \\ 1 & 0 & -1 \end{bmatrix} \quad (4)$$

[Math. 5]

$$F_V = \begin{bmatrix} 1 & 2 & 1 \\ 0 & 0 & 0 \\ -1 & -2 & -1 \end{bmatrix} \quad (5)$$

As shown in the following Equations (6) to (11), an edge value is calculated at each pixel position in the reference image and the region of interest of the display image. "*" is a convolution operator. N is a normalization factor for keeping values in a region from 0 to 1, and N=4, here. IRef is a luminance (Y) channel of the reference image. $IRef_{(x,y)}$ is a pixel at the position (x, y) in the luminance channel of the reference image. x is an integer that satisfies 0<x≤m, and y is an inter that satisfies 0<y≤n. IRen is a luminance channel of the display image in the region of interest. $IRen_{(x,y)}$ indicates 3×3 pixels that are centered at a position (x, y) in the luminance channel of the display image in the region of interest.

[Math. 6]

$$E1_{(x,y)} = \frac{\begin{bmatrix} E1_H \\ E1_V \end{bmatrix}_{(x,y)}}{N} \quad (6)$$

[Math. 7]

$$E1_{H(x,y)} = F_H * IRef_{(x,y)} \quad (7)$$

[Math. 8]

$$E1_{V(x,y)} = F_V * IRef_{(x,y)} \quad (8)$$

[Math. 9]

$$E2_{(x,y)} = \frac{\begin{bmatrix} E2_H \\ E2_V \end{bmatrix}_{(x,y)}}{N} \quad (9)$$

[Math. 10]

$$E2_{H(x,y)} = F_H * IRen_{(x,y)} \quad (10)$$

[Math. 11]

$$E2_{V(x,y)} = F_V * IRen_{(x,y)} \quad (11)$$

As shown in the following Equations (12) to (15), the shape index Match (conformity value) Is obtained from the above-described edge values. "*" represents an inner product operator.

[Math. 12]

$$S = \sum_{y=0}^{n} \sum_{x=0}^{m} E1_{(x,y)} \cdot E2_{(x,y)} \quad (12)$$

[Math. 13]

$$T1 = \sum_{y=0}^{n} \sum_{x=0}^{m} E1_{(x,y)} \cdot E1_{(x,y)} \quad (13)$$

[Math. 14]

$$T2 = \sum_{y=0}^{n} \sum_{x=0}^{m} E2_{(x,y)} \cdot E2_{(x,y)} \quad (14)$$

[Math. 15]

$$\text{Match} = \frac{S}{(T1+T2)/2} \quad (15)$$

When the above-described computations are applied to FIGS. 15 and 16, Match=0.78 is obtained, for example.

In the case where the conformity value is required to be calculated without analyzing the background, calculations shown in the following Equations (16) to (21) are used.

[Math. 16]

$$E1^f_{(x,y)} = E1_{(x,y)} M_{(x,y)} \quad (16)$$

[Math. 17]

$$E2^f_{(x,y)} = E2_{(x,y)} M_{(x,y)} \quad (17)$$

[Math. 18]

$$S^f = \sum_{y=0}^{n} \sum_{x=0}^{m} E1^f_{(x,y)} \cdot E2^f_{(x,y)} \quad (18)$$

[Math. 19]
$$T1^f = \sum_{y=0}^{n}\sum_{x=0}^{m} E1^f_{(x,y)} \cdot E1^f_{(x,y)} \quad (19)$$

[Math. 20]
$$T2^f = \sum_{y=0}^{n}\sum_{x=0}^{m} E2^f_{(x,y)} \cdot E2^f_{(x,y)} \quad (20)$$

[Math. 21]
$$\text{Match} = \frac{S^f}{(T1^f + T2^f)/2} \quad (21)$$

$M_{(x,y)}$ is 1. Note that $M_{(x,y)}$ may be mask pixels that define on which pixels comparison is to be performed. This mask can be realized by a simple 1-bit mask in which a pixel that is not a comparison target is defined by 0, and a pixel that is a target of comparison is defined by 1. For example, in a case where image comparison is desired to be performed on a portion of the region of interest, such as a case where only an icon is the comparison target, a mask according to the desire may be set.

According to the above-described embodiment, the comparison circuit 145 obtains an index that represents the degree of matching between the analysis image and the reference image based on the pixel values of the analysis image and the pixel values of the reference image, or based on the pixel values of an edge image of the analysis image and the pixel values of an edge image of the reference image. The error detection circuit 150 performs error detection on the display image based on the index.

In this way, error detection can be performed on an analysis image based on the index that represents the degree of matching between the analysis image and a reference image, without performing bit-wise error detection such as CRC. If the degree of matching between the analysis image and the reference image is high, it is highly possible that the shape of the analysis image is visually seen as the same shape as the reference image. That is, according to the present method, it is possible that an error is determined when the shape of an analysis image is not properly displayed. Also, if an error is not detected in the analysis image, it can be determined that the mapping processing has been properly performed, and therefore, as a result of performing error detection on the analysis image, an error in an image to be projected onto a projection target object can be detected.

Here, the first computation method shown by the above Equations (2) to (4) corresponds to a case where the index (S) is obtained based on the pixel values of an analysis image and the pixel values of a reference image. Also, the second computation method shown by the above Equations (5) to (21) corresponds to a case where the index (Match) is obtained based on the pixel values of an edge image of the analysis image and the pixel values of an edge image of the reference image. The pixel value of an edge image corresponds to an edge amount in the above Equations (6), (9), (16), and (17).

Also, the degree of matching refers to a matching degree of the shape of an icon, a character, a figure, a mark, or the like (hereinafter referred to as icon or the like), for example. More specifically, the degree of matching refers to a matching degree with respect to the outline and the orientation of an icon or the like. Also, furthermore, the degree of matching may include a matching degree of the state of the inside of the outline of an icon or the like, that is, the state as to whether or not the inside of an outline is filled or the like, for example. For example, the index representing the degree of matching has a larger value as the degree of matching between the foreground image and the background image increases.

Also, in the present embodiment, as shown in the above Equations (2) and (3), the comparison circuit 145 obtains the index (S) from a value obtained by dividing a given threshold value (T) by the distance information (D).

Since the higher the matching degree of the shapes is, the smaller the distance (D) is, the index (S) whose value increases as the matching degree of the shapes increases can be obtained by dividing the given threshold value by the distance information.

Also, in the present embodiment, the comparison circuit 145 performs a sum-of-product operation (Equation (12)) of the pixel values of an edge image of the analysis image and the pixel values of an edge image of the reference image, and obtains the index from the result of the sum-of-product operation (Equation (15)).

The edge image is an image in which the pixel value of each pixel represents an edge amount. In the case where the shapes match, if the edge image of the analysis image is compared with the edge image of the reference image with respect to the same pixel, the edge amounts must be the same (approximately the same). Conversely, in the case where the shapes do not match, the positions of edges are different between the analysis image and the reference image, therefore, even if there is a large edge amount in the edge image of the analysis image, there are cases where the edge amount of the same pixel in the edge image of the reference image is zero, for example. Therefore, when a product of edge amounts of the same pixel is obtained, and then the sum of products is calculated, if the shapes match, the sum of products takes a large value, and if the shapes do not match, the sum of products takes a small value. Accordingly, as a result of using a sum-of-products operation of edge amounts, the matching degree of shapes can be appropriately evaluated.

Here, in the above Equation (12), the "product" of the sum of products is an inner product of vectors, but the "product" is not limited thereto. For example, when the edge amount is defined by a scalar, the "product" is a product of scalars.

3.3. First Computation Method of Obtaining Visibility Index (Second Index)

In a computation of the visibility index as well, the terms of analysis image and reference image are used similarly to the computation of the shape index. In FIGS. 1 and 4, the image IMA3 is the analysis image, and the image IMA1 is the reference image. In FIGS. 6 and 8, the image IMB2 is the analysis image and the image IMB3 is the reference image. Note that the comparison processing is relative comparison between two images, and therefore the analysis image and the reference image may be exchanged.

Figure 17:
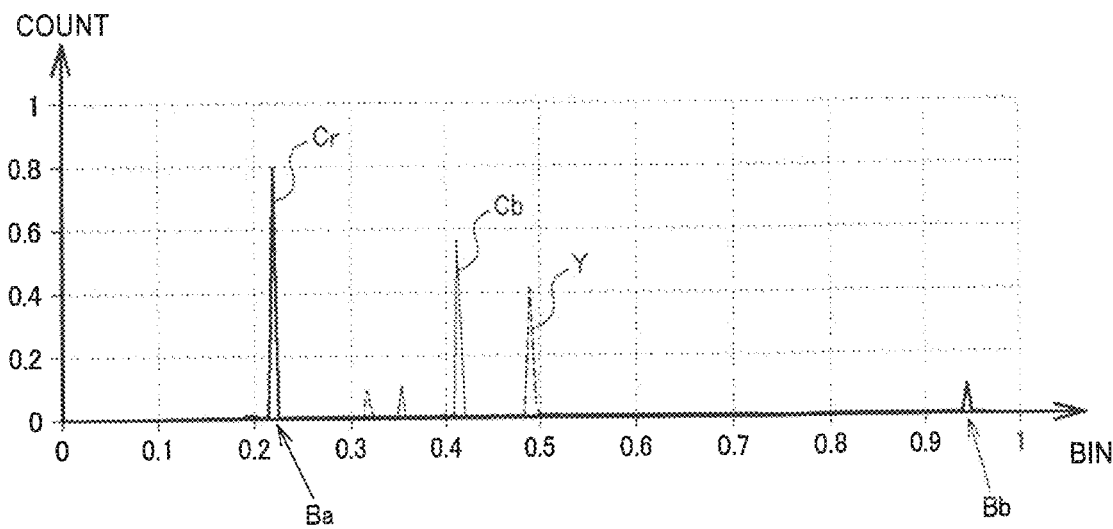
FIG. 17 shows a histogram of YCbCr channels in a region of interest.
Figure 18:
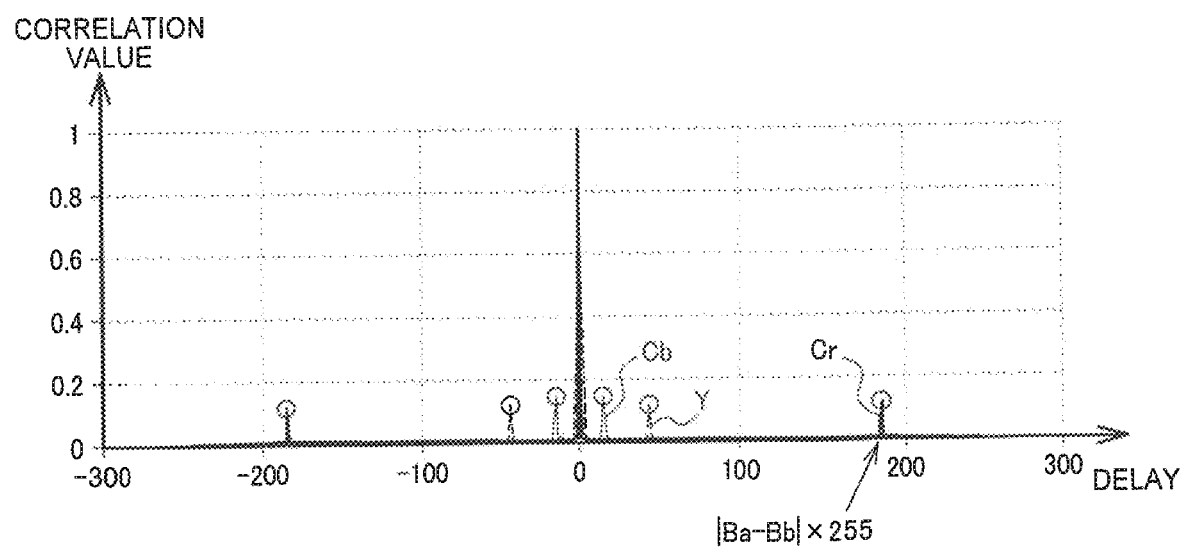
FIG. 18 shows cross-correlation values obtained by performing a cross-correlation operation on the histogram.

FIG. 17 shows a histogram of YCbCr channels in a region of interest. Also, FIG. 18 shows cross-correlation values obtained by performing a cross-correlation operation on the histograms of the analysis image and the reference image.

As shown in FIG. 17, a histogram is obtained for each channel of a YCbCr image using n binaries. For example, 256 binaries are used, and a histogram that includes a set of different binaries can be generated.

The histogram is generated by counting the number of occurrences of a specific value in a region of interest. That is, for each of the channels of a YCbCr image, the number of pixels that have a value indicated by each binary is counted in the region of interest. Next, the histogram is normalized to have a value from 0 to a. The value "a" can be selected considering ease of in implementation. For example, a can be set to one, 255, or the like. In FIG. 17, a=1. Next, a cross-correlation operation is performed on the histograms of the analysis image and the reference image for each channel. Then, the resultant cross-correlation signal is used in an analysis thereafter. As shown in FIG. 18, the cross-correlation signal is normalized such that the peak value at zero delay is one or a pre-set value.

The cross-correlation value can be obtained using the following Equation (22). f and g represent functions on which the correlation operation is performed. One of the functions f and g is the histogram of the analysis image, and the other of the functions f and g is the histogram of the reference image. f*g represents the correlation operation between the function f and the function g. f* represents a complex conjugate of the function f, and f*=f in the present embodiment. m represents binary number in the histogram. n represents a delay (lag), and n is an integer from −255 to +255, in FIG. 18.

[Math. 22]

$$(f * g)[n] = \sum_{m=-\infty}^{\infty} f^*[m]g[m+n] \quad (22)$$

Note that, 256 binaries are normalized to values from 0 to 1 in the histogram in FIG. 17, and therefore the horizontal axis shows a value from 0 to 1. The correlation values in FIG. 18 are obtained by changing the delay by one binary, and therefore the horizontal axis shows values from −(256−1) to +(256−1).

As shown in FIG. 18, when a two-color image exists in the region of interest, sidebands are obtained through the correlation operation. The distance of the delay from the center at which the above-described peak occurs indicates the contrast between colors. The center corresponds to zero delay. Because the human eye can distinguish features of an image through a contrast, the peaks of all of the three channels need to be checked. The contrast is a luminance contrast or color contrast, for example. In FIG. 18, the Y channel is indicated by broken lines, the Cb channel is indicated by thin solid lines, and the Cr channel is indicated by thick solid lines. The checking is performed by setting a threshold value for a peak search such that noise in the cross-correlation signal is not picked up. For example, the minimum peak threshold is set to 0.05. The local maximum value is obtained by searching for the peak in the signal. The peak to be searched for is a peak having a peak value that is larger than the threshold value.

Note that the minimum distance between successive peaks can be set to a predetermined value in order to evade an in-band signal peak. These threshold values are adjustable values and appropriate values are selected according to the application.

In order to obtain a visibility index that indicates whether or not a distinguishable image is displayed on a background having two or more colors, all of the peaks in the cross-correlation signal exceeding a noise threshold value are obtained with respect to all of the channels, and thereafter, the maximum distance at which a peak occurs, that is, the maximum delay is obtained. The maximum value of the delays at which peaks occur in three channels is selected as the index that indicates visibility.

In a correlation plot shown in FIG. 18, peaks are indicated with circles. In the illustrated example, the Cr channel shows the maximum separation, and the distance is 184. This value is normalized to a conceivable maximum delay. For example, the conceivable maximum delay is 256, which is the number of binaries in the histogram. Therefore, the index value is 184/255=0.722. In an image shown in FIG. 9, this index value is shown as a Vis parameter. This computation is illustrated with respect to one example.

The inside of the icon A2 that is a portion illustrated by black in FIG. 9 is red, and the background that is a portion illustrated by white is green.

In the image in FIG. 9, there are two pixel groups, namely a red pixel group and a green pixel group, in the region of interest, and therefore, in the histogram shown in FIG. 17, two peaks, one of which is large and the other is small, occur for each YCbCr channel. For example, in the Cr channel, peaks occur at binaries Ba and Bb. The distance between the two peaks represents the contrast between the color of a foreground icon, which is the icon, and the color of the background, and the larger the distance, the larger the difference between the colors of the foreground and the background. The distance between two peaks in the histogram is the distance of the delay at which a peak occurs in the cross-correlation values shown in FIG. 18. Since the foreground icon, which is the icon, is red and the background is green, in the image in FIG. 9, the distance between two peaks with respect to the Cr channel is the largest distance in the histogram shown in FIG. 17, and the distance is |Ba−Bb|×255. This is detected as the maximum distance at which a peak occurs in the cross-correlation value, and the normalized index value is |Ba−Bb|. Accordingly, the larger the contrast between the color of the foreground icon, which is the icon, and the color of the background, the larger the visibility index value.

The error detection circuit 150 performs error detection based on the visibility index obtained as described above. For example, the visibility index is compared with a given threshold value, and if the visibility index is smaller than the given threshold value, an error is determined. Alternatively, the visibility index may be output to a device external to the circuit device 100 as the error detection result.

3.4. Second to Fourth Computation Methods of Obtaining Visibility Index

In a second computation method, whether or not there is a peak having a height that exceeds a predetermined threshold value in a cross-correlation signal is checked instead of obtaining the distance of the peak from the central point. If there is such a peak, the analysis image matches the reference image to a substantial degree as long as the pixel distribution is considered. Accordingly, error detection at a first level can be performed on the analysis image. This parameter does not indicate spatial correlation, and indicates only pixel distribution correlation. The index in this case is not the distance of a peak from the central point, and may be the peak value itself.

Figure 19:
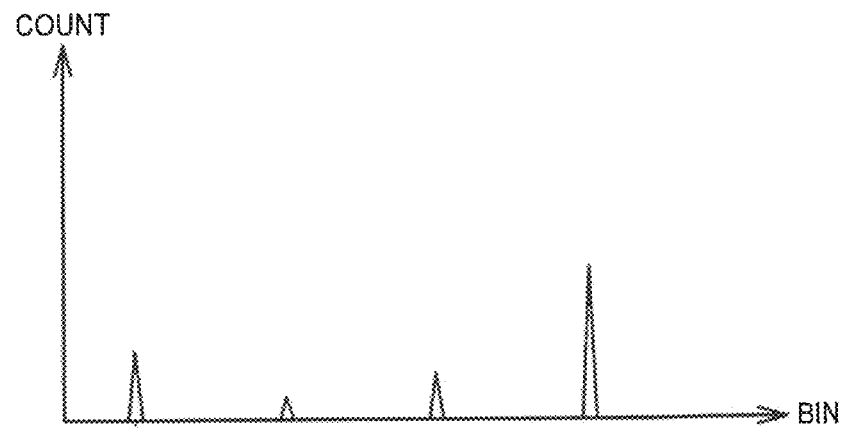
FIG. 19 shows an example of histograms of an analysis image and a reference image.
Figure 19:
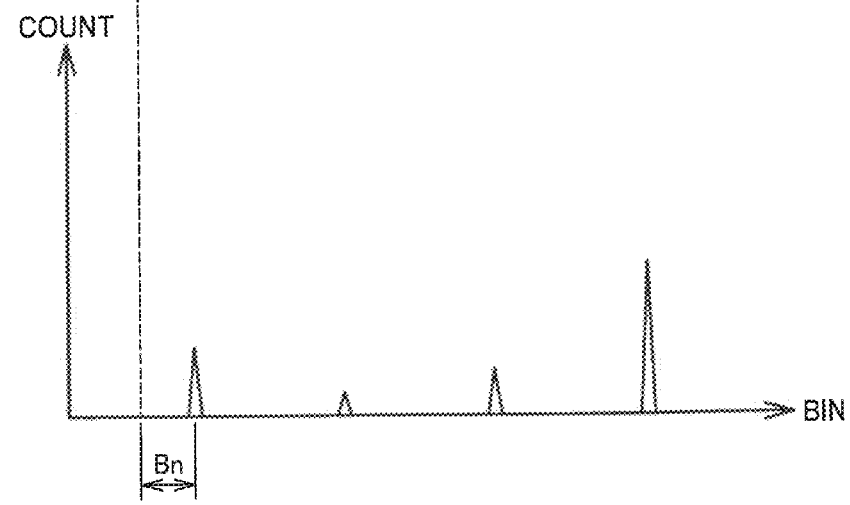
Figure 20:
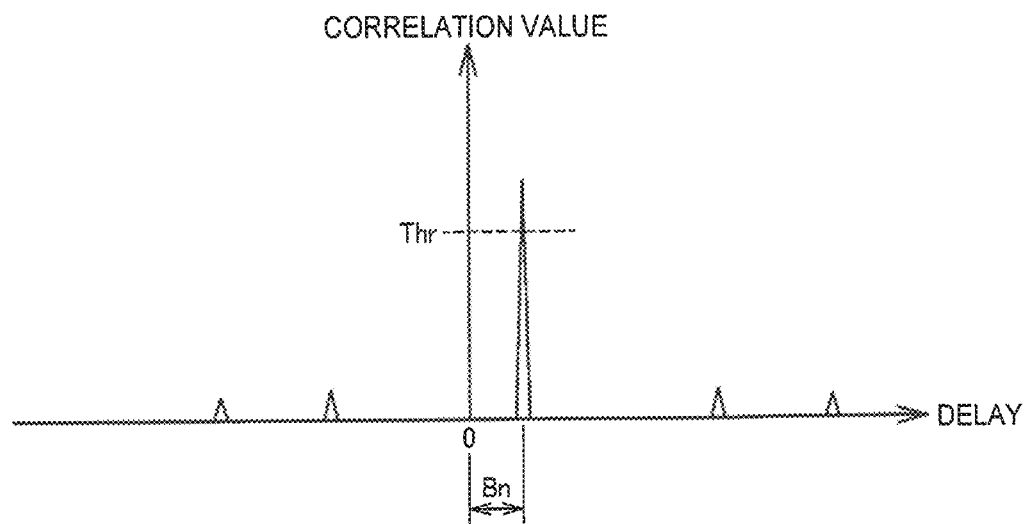
FIG. 20 is an example of cross-correlation values of the histograms of the analysis image and the reference image.

FIG. 19 shows an example of histograms of the analysis image and the reference image. FIG. 20 shows an example of the cross-correlation values of the histogram in FIG. 19. Here, a description will be given with respect to one channel of a color image, but similar processing is performed on a plurality of channels. For example, the maximum peak value of peaks in the cross-correlation values with respect to the plurality of channels may be adopted.

As shown in FIG. 19, three or more peaks occur in the histogram of the analysis image and the reference image. In the example in FIG. 19, there are four peaks. Assume that the peaks in the histogram of the analysis image shifts from the peaks in the histogram of the reference image by Bn. In this case, as shown in FIG. 20, a large peak appears at a delay Bn in the cross-correlation value. If the peak value of this peak is larger than a threshold value Thr, the peak value is adopted as the visibility index value, for example.

In a third computation method, a ratio of contrast between the foreground and the background is obtained as the visibility index value.

In the first computation method, the difference |Ba−Bb| between binaries Ba and Bb at which peaks occur in the histogram of the Cr channel is used as the visibility index value.

In the third computation method, a contrast ratio |Ba−Bb|/Ba or |Ba−Bb|/Bb is obtained, and the contrast ratio is used as the visibility index value. Alternatively, in the case of using a reference image such as the case of the second computation method, C1=|Ba−Bb| in the analysis image, and C2=Ba−Bb| in the reference image are obtained, a contrast ratio C1/C2 or C2/C1 is obtained, and the contrast ratio is used as the visibility index value.

In a fourth computation method, a multi-dimensional histogram is generated so as to obtain the visibility index.

In the first computation method, one-dimensional histogram for each channel is used to analyze the visibility.

On the other hand, in the fourth computation method, a multi-dimensional histogram is generated from signals of a plurality of channels, and a multi-dimensional correlation operation is performed on the multi-dimensional histogram so as to obtain the visibility index. The multi-dimensional correlation operation is a multi-dimensional cross-correlation operation. Accordingly, it is possible to favorably simulate the contrast detection by human eyes. There are cases where more favorable performance can be obtained using a 3D color histogram.

According to the above-described embodiment, the comparison circuit 145 statistically obtains an index based on pixel values of the analysis image and the reference image.

Obtaining an index statistically is to obtain an index by performing processing using a statistical method in which a plurality of pixel values included in the analysis image are first population in the statistics, and a plurality of pixel values included in the reference image are second population in the statistics. Specifically, histograms are respectively generated from the analysis image and the reference image, and an index is obtained based on the histograms.

According to the present embodiment, as a result of statistically obtaining an index, an index representing the degree of dissimilarity between a foreground image and a background image can be obtained. That is, instead of detecting a defect in data as in a case of using CRC, the degree of dissimilarity between the foreground image and the background image is evaluated using a statistical method, and whether or not an error is determined is determined based on the degree of dissimilarity.

Also, in the present embodiment, the comparison circuit 145 obtains histograms of pixel values of the analysis image and the reference image, and performs a correlation operation using the histograms. In the above-described example, pixel values are YCbCr pixel values. The comparison circuit 145 obtains the visibility index that represents the degree of dissimilarity between the foreground image, which is an image of the region of interest of the analysis image, and the background image corresponding to the background, of the analysis image, of the foreground image based on a result of the correlation operation. The error detection circuit 150 performs error detection based on the index.

When the dissimilarity degree of the foreground image relative to the background image is high, the likelihood that the foreground image will be visually distinguished from the background image is high, and the visibility of the foreground image is considered to be high. That is, according to the present method, an error can be determined when the visibility of the foreground image is low. For example, an icon or the like for warning a user is displayed in an on-board meter panel or the like. According to the present embodiment, the display of such an icon is not stopped due to a one-bit error or the like, and the icon is displayed as much as possible to war the user while the visibility of the icon is secured.

Here, the foreground image is an image of the region, of the analysis image, with respect to which the degree of dissimilarity from the background image is desired to be determined based on the index. Also, the region is the given region. Also, the background image is a portion of or the entirety of the display image excluding the foreground image. That is, the region of interest that is a region including the foreground image is set to a portion of or the entirety of the display image, and the image of a region, of the region of interest, excluding the foreground image is the background image.

Also, the degree of dissimilarity is a degree of dissimilarity in each component that is a constituent component in a color space. A constituent component is also referred to as a channel. For example in the YCbCr space, the degree of dissimilarity represents the degree of difference between the luminance of the foreground image and the luminance of the background image, or the degree of difference between the color of the foreground image and the color of the background image. Alternatively, in the RGB space, the degree of dissimilarity represents the degree of difference between the color of the foreground image and the color of the background image.

Also, in the present embodiment, the comparison circuit 145 obtains histograms of the respective constituent components in the color space, performs a cross-correlation operation on the histograms of the components, obtains distances at which cross-correlation peaks occur with respect to the respective components, and obtains an index based on the maximum distance of the obtained distances. The maximum distance is |Ba−Bb| in FIG. 18, and the index here is the visibility index.

In this way, the index can be obtained using the component having the maximum difference between the foreground image and the background image, of the constituent components in the color space. The component having the maximum difference between the foreground image and the background image is considered to be a component that is visually recognized to have a large difference, and therefore, as a result of obtaining the index using the component, the degree of dissimilarity between the background and the foreground can be evaluated. Also, the visibility of the foreground can be appropriately evaluated using this index.

Here, the index needs only be a value obtained based on the maximum distance |Ba−Bb|. For example, in the first computation method, the index is the maximum distance |Ba−Bb| itself. Also, in the second computation method, the index is a contrast ratio based on the maximum distance |Ba−Bb|. The contrast ratio is |Ba−Bb|/Ba or the like, for example.

Also, in the present embodiment, as described in FIGS. 19 and 20, the comparison circuit 145 obtains first histograms of respective constituent components in the color space from the analysis image as histograms, and obtains second histograms of the respective components from the reference image. The comparison circuit 145 performs a cross-correlation operation on the first histogram and the second histogram for each component, and obtains the index based on the peak value of the cross-correlation peak.

In this way, even if the analysis image and the reference image are in multiple tones including two or more colors, the index representing the degree of dissimilarity between the foreground image and the background image can be obtained. That is, although two or more peaks occur in the histogram of the reference image, if the same pattern as this histogram is included in the histogram of the analysis image, it can be determined that an image similar to the reference image, in at least a color or luminance pattern, is included in the analysis image. In this case, a large peak is to occur in a result of a cross-correlation operation, and thus the visibility of the foreground can be appropriately evaluated by obtaining the index from the peak value.

Also, in the present embodiment, the comparison circuit 145 obtains the shape index, which is the first index, and the visibility index, which is the second index. The error detection circuit 150 performs error detection based on the first index and the second index.

In this way, an error in the projection image can be detected using two indices, in a combined manner, that have been obtained by evaluating two properties that are different to each other. That is, as a result of combining the visibility index that represents the degree of dissimilarity between the analysis image and the reference image in luminance or color, and the shape index that represents the degree of matching between the analysis image and the reference image in shape, highly accurate error detection can be performed on the projection image.

4. Electronic Apparatus

Figure 21:
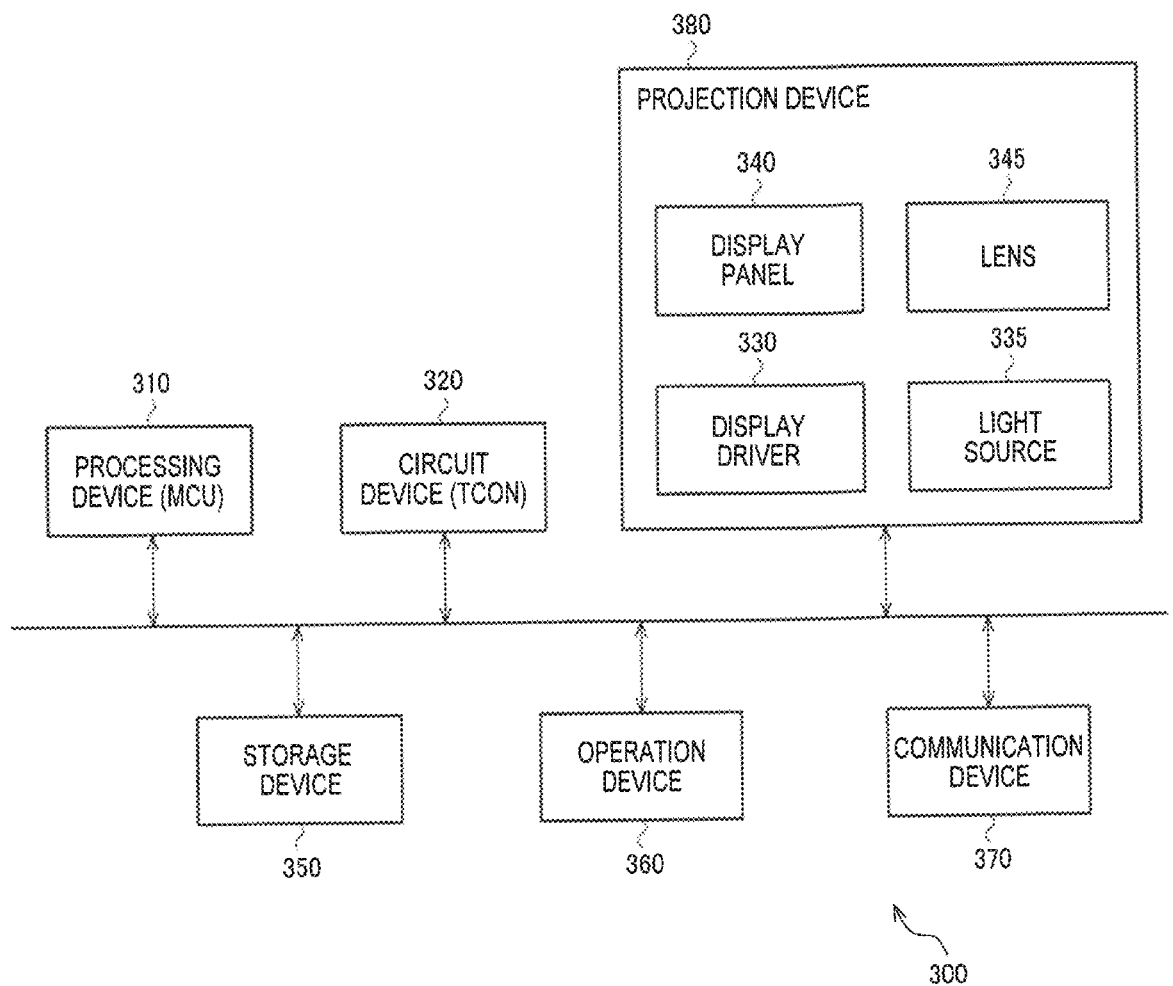
FIG. 21 shows an exemplary configuration of an electronic apparatus.

FIG. 21 shows an exemplary configuration of an electronic apparatus including the circuit device of the present embodiment. The electronic apparatus 300 includes a processing device 310, a circuit device 320, a projection device 380, a storage device 350, an operation device 360, and a communication device 370. The processing device 310 is an MCU or the like, for example. The circuit device 320 corresponds to the circuit device 100 in FIG. 1, 4, 6, or 8, and is a head up display controller or a display controller, for example.

The projection device 380 includes a display driver 330, a display panel 340, a light source 335, and a lens 345. The display driver 330 drives the display panel 340 for image display. The light source 335 outputs projection light to the display panel 340, and the light that has passed through the display panel 340 or the light reflected from the display panel 340 is incident on the lens 345. The lens 345 is for forming an image on a projection target object.

The processing device 310 transfers image data stored in the storage device 350, or image data received by the communication device 370 to the circuit device 320. The circuit device 320 performs image processing on image data, display timing control, error detection processing on image data to be transferred to a display driver, and the like. In error detection processing, the visibility index and the shape index are calculated, and error detection based on these indices is performed. The display driver 330 drives the display panel 340 so as to display an image based on image data transferred from the circuit device 320 and display timing control performed by the circuit device 320. The display panel 340 is a liquid-crystal display panel, for example. The storage device 350 is a memory, a hard disk drive, an optical disk drive, or the like. The operation device 360 is a device for allowing a user to operate the electronic apparatus 300, and is a button, a touch panel, a keyboard, or the like. The communication device 370 is a device for performing wired communication, or a device for performing wireless communication, for example. The wired communication is a LAN, a USB, or the like, for example. The wireless communication is a wireless LAN, proximity wireless communication, or the like, for example.

Although a case where the electronic apparatus is a head up display has been described as an example in FIG. 21, the electronic apparatus including the circuit device of the present embodiment is not limited thereto. Various apparatuses, such as a head mounted display and a projector, for example, that project an image onto a projection target object can be envisioned as the electronic apparatus including the circuit device of the present embodiment. The configuration of the electronic apparatus is not limited to that shown in FIG. 21, and various configurations can be adopted according to the application. For example, in the in-vehicle electronic apparatus, the circuit device 320, the projection device 380, and the operation device 360 are incorporated into the meter panel, and the processing device 310, the storage device 350, and the communication device 370 are incorporated into the ECU (Electronic Control Unit). In this case, the meter panel corresponds to the electronic apparatus including the circuit device of the present embodiment.

Note that, although the present embodiment has been described in detail as described above, a person skilled in the art will appreciate that numerous modifications can be made without substantially departing from the novel matter and effects of the invention. Accordingly, all such modifications are intended to be embraced within the scope of the invention. For example, terms that appear in the description or drawings at least once together with other broader or synonymous terms can be replaced by those other terms in any part of the description or drawings. Also, all combinations of the present embodiment and the modifications are embraced within the scope of the invention. Also, the configurations and operations of the circuit device and the electronic apparatus are not limited to those described in the embodiment, and various modifications can be implemented.

What is claimed is:

1. A circuit device comprising:
   an image processing circuit configured to perform first mapping processing, which maps an input first image to output a second image to be projected onto a projection target object, and
   second mapping processing, which converts the second image outputted from the first mapping processing into a third image, wherein the second mapping processing is reverse mapping processing of the first mapping processing so that the third image represents a re-created source image of the second image; and
   a comparison circuit configured to perform comparison between the first image and the third image, and output a result of comparison as information for performing error detection on the second image, with the proviso that when an amount of difference between the first image and the third image exceeds a threshold, information indicating that an error is detected on the second image is output;

wherein the comparison circuit is configured to obtain an index that represents a degree of matching between the first image and the third image as the result of comparison, based on pixel values of the first image and pixel values of the third image, or based on pixel values of an edge image of the first image and pixel values of an edge image of the third image.

2. The circuit device according to claim 1, wherein the image processing circuit performs the first mapping processing using first map data generated from map data associated with the projection target object, and performs the second mapping processing using second map data, the second map data being the map data.

3. The circuit device according to claim 1, wherein the image processing circuit is configured to generate the third image whose resolution is lower than that of the first image; and
the comparison circuit is configured to reduce the resolution of the first image so as to match the resolution of the third image, and compare the third image with the first image whose resolution has been reduced.

4. The circuit device according to claim 1, further comprising
an error detection circuit configured to perform error detection on the second image based on the result of comparison indicating whether or not the amount of difference between the second image and the third image exceeds the threshold.

5. The circuit device according to claim 4, further comprising
an operation mode setting register in which an operation mode of the circuit device when the error is determined by the error detection circuit is set.

6. The circuit device according to claim 5, wherein in the operation mode setting register, a mode of reporting a result of the error detection to a device external to the circuit device, a mode of not displaying the second image, or a mode of displaying a specific image, is set as the operation mode.

7. The circuit device according to claim 1, further comprising
a threshold value register in which a value of the threshold is set.

8. An electronic apparatus comprising the circuit device according to claim 1.

9. A circuit device comprising:
an image processing circuit configured to perform first mapping processing, which maps an input first image to output a second image to be projected onto a projection target object, based on map data associated with a projection target object, and
second mapping processing, which is different from the first mapping processing, the second mapping processing converting the first image to a third image based on the map data so that the third image is created from the same first image used to create the second image; and
a comparison circuit configured to perform comparison between the second image and the third image, and output a result of comparison as information for performing error detection on the second image, with the proviso that when an amount of difference between the second image and the third image exceeds a threshold, information indicating that an error is detected on the second image is output;
wherein the comparison circuit is configured to obtain an index that represents a degree of matching between the second image and the third image as the result of comparison, based on pixel values of the second image and pixel values of the third image, or based on pixel values of an edge image of the second image and pixel values of an edge image of the third image.

10. The circuit device according to claim 9, wherein the image processing circuit performs the first mapping processing using first map data generated from the map data, and performs the second mapping processing using second map data, the second map data being the map data.

11. The circuit device according to claim 9, wherein:
the image processing circuit is configured to generate the third image whose resolution is lower than that of the second image; and
the comparison circuit is configured to reduce the resolution of the second image so as to match the resolution of the third image, and compare the third image with the second image whose resolution has been reduced.

12. A device comprising at least one processor programmed to:
perform a first process that converts first image data to second image data, the second image data to be projected onto a projection surface;
perform a second process that converts the second image data outputted from the first mapping processing into third image data, wherein the second process is a reverse process of the first process so that the third image represents a re-created source image of the second image;
perform a comparison between the first image data and the third image data; and
detect presence or absence of an error in the second image data based on a result of the comparison, with the proviso that when an amount of difference between the first image and the third image exceeds a threshold, information indicating that an error is detected on the second image is output;
wherein the result of comparison indicates at least one of (i) a degree of matching between the first image data and the third image data and (ii) a degree of visibility of the first image data and of the third image data.

13. The device according to claim 12, wherein the at least one processor is further programmed to:
retrieve reference map data associated with the projection surface from a storage device;
convert the reference map data to processed map data;
perform the first process using the processed map data; and
perform the second process using the reference map data retrieved from the storage device.

14. A device comprising:
at least one processor programmed to:
perform a first process that converts first image data to second image data, the second image data to be projected onto a projection surface;
perform a second process that converts the first image data to third image data, wherein the second process is different from the first process so that the third image is created from the same first image used to create the second image;
perform a comparison between the second image data and the third image data; and
detect presence or absence of an error in the second image data based on a result of the comparison, with the proviso that when an amount of difference between the second image and the third image exceeds a threshold, information indicating that an error is detected on the second image is output;

wherein the result of comparison indicates at least one of (i) a degree of matching between the second image data and the third image data and (ii) a degree of visibility of the second image data and of the third image data.

15. The device according to claim 14, wherein the at least one processor is further programmed to:

retrieve reference map data associated with the projection surface from a storage device;

convert the reference map data to processed map data;

perform the first process using the processed map data; and perform the second process using the reference map data retrieved from the storage device.

* * * * *